United States Patent
Misawa et al.

(10) Patent No.: US 6,355,327 B1
(45) Date of Patent: *Mar. 12, 2002

(54) OPTICAL RECORDING MEDIUM AND DIPYRROMETHENE METAL CHELATE COMPOUND FOR USE THEREIN

(75) Inventors: Tsutami Misawa; Taizo Nishimoto; Hisashi Tsukahara; Akira Ogiso; Kenichi Sugimoto; Kenji Mizoue; Keisuke Takuma, all of Kanagawa; Kenichi Kato, Hyogo; Toshihiro Masaoka; Yojiro Kumagae, both of Osaka, all of (JP)

(73) Assignees: Mitsui Chemicals, Inc.; Yamamoto Chemicals, Inc., both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/685,647

(22) Filed: Oct. 6, 2000

Related U.S. Application Data

(63) Continuation of application No. 09/149,027, filed on Sep. 8, 1998, now Pat. No. 6,162,520.

(30) Foreign Application Priority Data

| Sep. 17, 1997 | (JP) | ............................................... 9-252010 |
| Dec. 4, 1997 | (JP) | ............................................... 9-334446 |
| Feb. 16, 1998 | (JP) | ........................................... 10-032908 |
| Feb. 16, 1998 | (JP) | ........................................... 10-032909 |
| May 19, 1998 | (JP) | ........................................... 10-136736 |

(51) Int. Cl.$^7$ ............................................... B32B 3/02
(52) U.S. Cl. ..................... 428/64.1; 428/64.4; 428/64.8; 428/913; 430/270.14; 430/270.16; 430/945; 369/283; 369/288
(58) Field of Search ............................... 428/64.1, 64.2, 428/64.4, 64.8, 913; 430/270.14, 270.16, 495.1, 945; 369/283, 288

(56) References Cited

U.S. PATENT DOCUMENTS

| 5,433,896 A | 7/1995 | Kang et al. |
| 5,948,593 A | 9/1999 | Misawa et al. |

FOREIGN PATENT DOCUMENTS

| EP | 0822544 | 2/1998 |
| JP | 4-74690 | 3/1992 |

(List continued on next page.)

OTHER PUBLICATIONS

Patent Abstracts of Japan, vol. 097, No. 009, Sep. 30, 1997 & JP 09131968 A (TDK CORP.), May 20, 1997. *Abstract*.

Primary Examiner—Elizabeth Evans
(74) Attorney, Agent, or Firm—Burns, Doane, Swecker, & Mathis, L.L.P.

(57) ABSTRACT

A novel optical recording medium having at least a recording layer and a reflective layer on a substrate is herein disclosed, wherein at least one dipyrromethene metal chelate compound represented by formula (1) is contained in the recording layer:

(1)

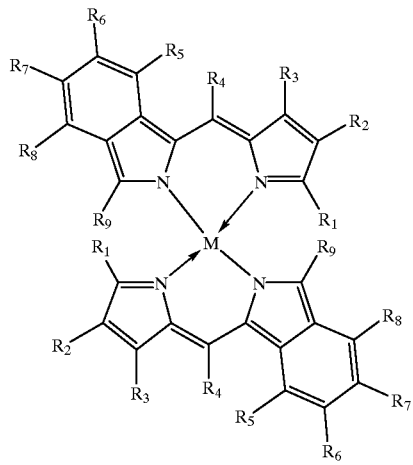

wherein $R_1$ and $R_9$ are each independently an alkenyl group, an aryl group or a heteroaryl group; $R_2$ to $R_8$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms; and M is a transition metal.

7 Claims, 1 Drawing Sheet

FOREIGN PATENT DOCUMENTS

| | | |
|---|---|---|
| JP | 5-38878 | 2/1993 |
| JP | 6-40161 | 2/1994 |
| JP | 6-40162 | 2/1994 |
| JP | 6-199045 | 7/1994 |
| JP | 6-336086 | 12/1994 |
| JP | 7-76169 | 3/1995 |
| JP | 7-125441 | 5/1995 |
| JP | 7-262604 | 10/1995 |
| JP | 9-156218 | 6/1997 |
| JP | 9-193544 | 7/1997 |
| JP | 9-193545 | 7/1997 |
| JP | 9-193547 | 7/1997 |
| JP | 9-194748 | 7/1997 |
| JP | 9-202052 | 8/1997 |
| JP | 9-267562 | 10/1997 |
| JP | 9-274732 | 10/1997 |

OPTICAL RECORDING MEDIUM AND DIPYRROMETHENE METAL CHELATE COMPOUND FOR USE THEREIN

This application is a continuation, of application Ser. No. 09/149,027, filed Sep. 8, 1998 now U.S. Pat. No. 6,162,520.

BACKGROUND OF THE INVENTION

1. Field of the Invention

The present invention relates to an optical recording medium in which a dipyrromethene metal chelate compound is used and which is recordable and reproducible at a higher density as compared with a conventional case.

2. Description of the Related Art

Presently, as an optical recording medium having a larger capacity as compared with a CD, a digital video disc (DVD) having a capacity of 4.7 GB has been developed and commercialized. The DVD is a ROM medium, and hence, recordable and reproducible optical record media having the corresponding capacity are desired. Among the DVDs, a write-once type is called a DVD-R.

In the DVD, in order to achieve a high-density recording, an oscillation wavelength of a laser beam is in the range of about 630 nm to 680 nm which are shorter wavelengths than in the case of the CD. As dyes for organic dye-including optical recording media which can be used within such short wavelengths, there have been suggested cyanine dyes, azo dyes, benzopyran-type dyes, benzodifuranone-type dyes, indigoid dyes, dioxazine-type dyes and porphyrin-type dyes in Japanese Patent Application Laid-open Nos. 74690/1992, 38878/1993, 40161/1994, 40162/1994, 199045/1994, 336086/1994, 76169/1995, 125441/1995, 262604/1995, 156218/1997, 193544/1997, 193545/1997, 193547/1997, 194748/1997, 202052/1997, 267562/1997 and 274732/1997. However, these conventional techniques have the problem of dye durability and particularly some problems peculiar to the uses of short wavelengths. For example, when a small pit is opened with a focussed laser beam, its periphery is widely affected, so that the largely expanded pit is inconveniently formed. This inconvenience causes the deterioration of a jitter and a radial cross talk. Conversely, in some of these conventional techniques, an extremely small pit is formed on occasion, and this inconvenience causes the deterioration of a modulated amplitude. In addition, when an organic dye having an unsuitable optical constant (a refractive index and an extinction coefficient) is selected and used for a recording layer at a desired laser wavelength, the deterioration of reflectance, sensitivity and the like occurs. Presently, these drawbacks have not been overcome at all yet.

SUMMARY OF THE INVENTION

An object of the present invention is to provide an optical recording medium which is recordable and reproducible by a short wave laser having a wavelength of 520 to 690 nm, is excellent in durability, and is suitable for a high-density recording.

The present inventors have already suggested a recordable and reproducible optical recording medium suitable for a high-density record, and in this kind of recording medium, a dipyrromethene metal chelate compound is used as an organic dye (Japanese Patent Application Laid-Open No. 226172/1998). The present inventors have further intensively investigated the optical recording medium in which the dipyrromethene metal chelate compound is used. As a result, it has been found that a selection of a dipyrromethene metal chelate compound having a substituent containing a vinyl group or a halogen atom, a substituent such as a specific aryl group or heteroaryl group into the α-position of pyrrole ring, or copper or cobalt as a coordination metal in the above dipyrromethene metal chelate compound, and the use of two or more kinds of the selected dipyrromethene metal chelate compounds in a recording layer can provide an optical recording medium, in which the deterioration of reflectance and sensitivity caused by a drawback of the organic dye, i.e., a wavelength dependence of optical characteristics is inhibited and which is excellent in jitter properties and durability. In consequence, the present invention has been attained. That is to say, the aspects of the present invention are as follows.

1. The first aspect of the present invention is directed to an optical recording medium having at least a recording layer and a reflective layer on a substrate, wherein at least one dipyrromethene metal chelate compound represented by formula (1) is contained in the recording layer:

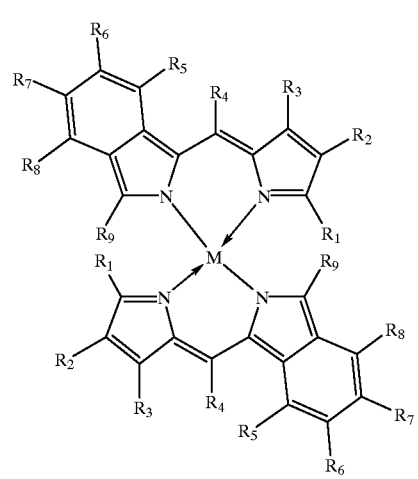

(1)

wherein $R_1$ and $R_9$ are each independently an alkenyl group, an aryl group or a heteroaryl group; $R_2$ to $R_8$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms; and M is a transition metal.

2. The second aspect of the present invention is directed to the optical recording medium according to the above paragraph 1 wherein $R_1$ in formula (1) is —CH=CH—$R_{10}$, wherein $R_{10}$ is a hydrogen atom, a halogen atom, or a substituted or unsubstituted alkyl, alkoxy, alkenyl, acyl, alkoxycarbonyl, aralkyl, aryl or heteroaryl group having 20 or less carbon atoms.

3. The third aspect of the present invention is directed to the optical recording medium according to the above paragraph 1 wherein $R_1$ in formula (1) is a substituted or unsubstituted aryl or heteroaryl group having 20 or less carbon atoms, and M is copper or cobalt.

4. The fourth aspect of the present invention is directed to the optical recording medium according to the above paragraph 3 wherein $R_1$ and $R_3$ in formula (1) are simultaneously substituted or unsubstituted aryl or heteroaryl groups having 20 or less carbon atoms.

5. The fifth aspect of the present invention is directed to the optical recording medium according to the above paragraph 4 wherein $R_1$, $R_3$ and $R_9$ in formula (1) are substituted or unsubstituted aryl groups having 20 or less carbon atoms, and at least one of the aryl groups is substituted by a halogen, or at least one of $R_2$, $R_4$ to $R_8$ is a halogen atom.

6. The sixth aspect of the present invention is directed to the optical recording medium according to any one of the above paragraphs 1 to 5 wherein the recording layer further includes at least one other dipyrromethene metal chelate compound represented by formula (2):

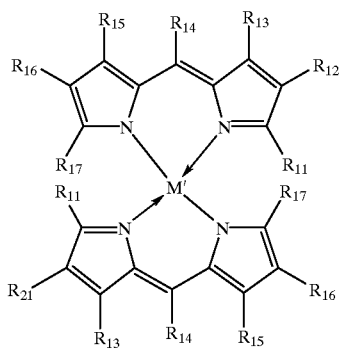

(2)

wherein $R_{11}$ to $R_{17}$ are each independently a hydrogen atom, a halogen atom, a nitro group, a cyano group, a hydroxyl group, an amino group, a carboxyl group, a sulfonic acid group, or a substituted or unsubstituted alkyl, alkoxy, alkylthio, aryloxy, arylthio, alkenyl, acyl, alkoxycarbonyl, carbamoyl, acylamino, aralkyl, aryl or heteroaryl group having 20 or less carbon atoms, and $R_{15}$ and $R_{16}$ may be bonded to each other to form an aromatic ring which may have at least one substituent; and M' is a transition element.

7. The seventh aspect of the present invention is directed to the optical recording medium according to the above paragraph 6 wherein the other dipyrromethene metal chelate compound is selected from compounds represented by formula (3):

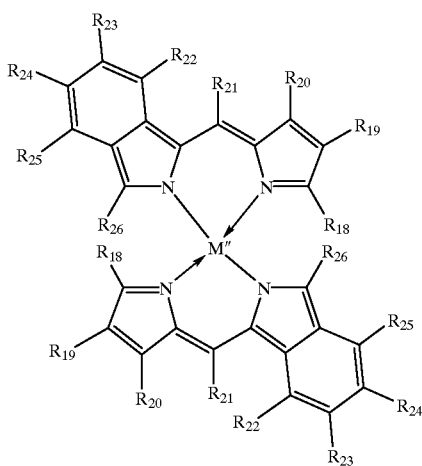

(3)

wherein $R_{19}$ to $R_{25}$ are each independently a hydrogen atom, a halogen atom, a nitro group, a cyano group, a hydroxyl group, an amino group, a carboxyl group, a sulfonic acid group, or a substituted or unsubstituted alkyl, alkoxy, alkylthio, aryloxy, arylthio, alkenyl, acyl, alkoxycarbonyl, carbamoyl, acylamino or aralkyl group having 20 or less carbon atoms; $R_{18}$ and $R_{26}$ are each independently an alkenyl group or an aryl group; and M" is copper or cobalt.

8. The eighth aspect of the present invention is directed to the optical recording medium according to any one of the above paragraphs 1 to 7 wherein at a laser wavelength of 520 to 690 nm, a refractive index and an extinction coefficient of the recording layer are 1.8 or more and 0.04 to 0.40, respectively.

9. The ninth aspect of the present invention is directed to the optical recording medium according to any one of the above paragraphs 1 to 7 which is recordable and reproducible by a laser beam selected within the wavelength range of 520 to 690 nm.

10. A dipyrromethene metal chelate compound represented by formula (4):

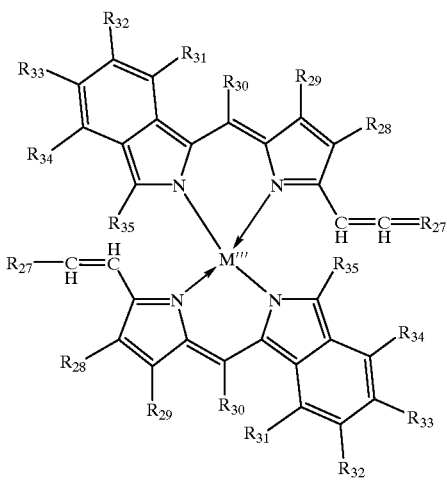

(4)

wherein $R_{27}$ to $R_{35}$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms; and M''' is a transition element.

The employment of at least one dipyrromethene metal chelate compound of the present invention as a recording layer enables the provision of a write-once type optical recording medium which is very noticed as a high-density recording medium and which is recordable and reproducible by a laser beam having a wavelength of 520 to 690 nm and which is excellent in durability.

DETAILED DESCRIPTION OF THE PREFERRED EMBODIMENTS

Figure 1:
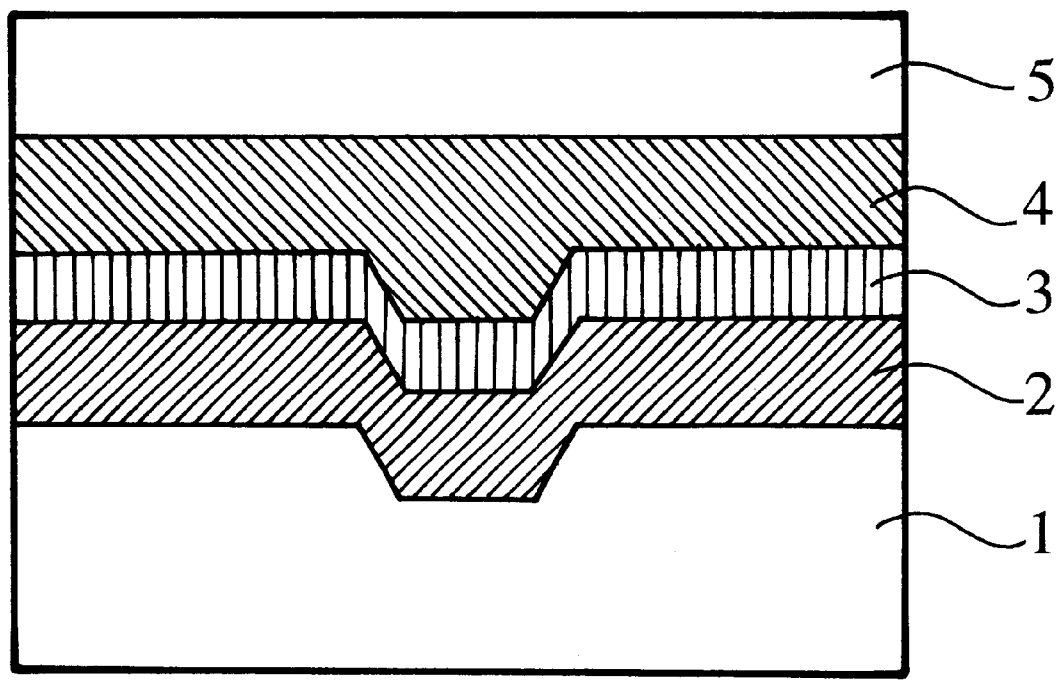
FIG. 1 is a sectional structure view illustrating layer constitutions of optical recording media of a conventional case and the present invention.

Now, the present invention will be described in detail.

In a dipyrromethene metal chelate compound represented by formula (1), $R_1$ and $R_9$ are each independently an alkenyl group, an aryl group or a heteroaryl group, and $R_2$ to $R_8$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms.

Examples of the aryl group represented by $R_1$ and $R_9$ include substituted and unsubstituted aryl groups having 20 or less carbon atoms such as a phenyl group, nitrophenyl groups, cyanophenyl groups, hydroxyphenyl groups, methylphenyl groups, ethylphenyl groups, n-butylphenyl groups, t-butylphenyl groups, cyclohexylphenyl groups, 2,4-dimethylphenyl group, 2,4-diisopropylphenyl group, 2,4,6-trimethylphenyl group, 2,6-dimethyl-4-t-butylphenyl group, fluorophenyl groups, chlorophenyl groups, bromophenyl groups, iodophenyl groups, 2,4-difluorophenyl group, 2,4-dichlorophenyl group, 2,4-dibromophenyl group, 2,4-diiodophenyl group, methoxyphenyl groups, ethoxyphenyl groups, n-butoxyphenyl groups, iso-amyloxyphenyl groups, trifluoromethylphenyl groups, N,N-dimethylaminophenyl groups, N,N-diethylaminophenyl groups, N,N-dibutylaminophenyl groups, 2-N,N-diethylamino-4-isopropylphenyl group, naphthyl group, nitronaphthyl groups, cyanonaphthyl groups, hydroxynaphthyl groups, methylnaphthyl groups, methoxynaphthyl groups, chloronaphthyl groups, bromonaphthyl groups and trifluoromethylnaphthyl groups;

and examples of the heteroaryl group represented by $R_1$ and $R_9$ include substituted and unsubstituted heteroaryl groups having 20 or less carbon atoms such as a pyrolyl groups, thienyl groups, furanyl groups, oxazoyl groups, isooxazoyl groups, oxadiazoyl groups, thiadiazoyl groups, imidazoyl groups, benzoxazoyl groups, benzothiazoyl groups, benzoimidazoyl groups, benzofuranyl groups and indoyl groups.

Examples of the alkenyl group represented by $R_1$ and $R_9$ include alkenyl groups which may have a substituent, and preferable examples thereof are represented by —CH=CHR$_{10}$, wherein $R_{10}$ is a hydrogen atom, a halogen atom, or a substituted or unsubstituted alkyl, alkoxy, alkenyl, acyl, alkoxycarbonyl, aralkyl, aryl or heteroaryl group having 20 or less carbon atoms.

Typical examples of $R_{10}$ include a hydrogen atom; halogen atoms such as fluorine, chlorine, bromine and iodine; substituted and unsubstituted alkyl groups having 20 or less carbon atoms such as a methyl group, ethyl group, n-propyl group, iso-propyl group, n-butyl group, iso-butyl group, sec-butyl group, t-butyl group, n-pentyl group, iso-pentyl group, 2-methylbutyl group, 1-methylbutyl group, neo-pentyl group, 1,2-dimethylpropyl group, 1,1-dimethylpropyl group, cyclopentyl group, n-hexyl group, 4-methylpentyl group, 3-methylpentyl group, 2-methylpentyl group, 1-methylpentyl group, 3,3-dimethylbutyl group, 2,3-dimethylbutyl group, 1,3-dimethylbutyl group, 2,2-dimethyl-butyl group, 1,2-dimethylbutyl group, 1,1-dimethylbutyl group, 3-ethylbutyl group, 2-ethylbutyl group, 1-ethylbutyl group, 1,2,2-trimethylbutyl group, 1,1,2-trimethylbutyl group, 1-ethyl-2-methylpropyl group, cyclo-hexyl group, n-heptyl group, 2-methylhexyl group, 3-methylhexyl group, 4-methylhexyl group, 5-methylhexyl group, 2,4-dimethylpentyl group, n-octyl group, 2-ethylhexyl group, 2,5-dimethylhexyl group, 2,5,5-trimethylpentyl group, 2,4-dimethylhexyl group, 2,2,4-trimethylpentyl group, 3,5,5-trimethylhexyl group, n-nonyl group, n-decyl group, 4-ethyloctyl group, 4-ethyl-4,5-dimethylhexyl group, n-undecyl group, n-dodecyl group, 1,3,5,7-tetraethyloctyl group, 4-butyloctyl group, 6,6-diethyloctyl group, n-tridecyl group, 6-methyl-4-butyloctyl group, n-tetradecyl group, n-pentadecyl group, 3,5-dimethyl-heptyl group, 2,6-dimethylheptyl group, 2,4-dimethylheptyl group, 2,2,5,5-tetramethylhexyl group, 1-cyclopentyl-2,2-dimethylpropyl group, 1-cyclohexyl-2,2-dimethylpropyl group, chloromethyl group, dichloromethyl group, fluoromethyl group, trifluoromethyl group, pentafluoroethyl group and nonafluorobutyl group;

substituted and unsubstituted alkoxy groups having 20 or less carbon atoms such as a methoxy group, ethoxy group, n-propoxy group, iso-propoxy group, n-butoxy group, iso-butoxy group, sec-butoxy group, t-butoxy group, n-pentoxy group, iso-pentoxy group, neo-pentoxy group, n-hexyloxy group, n-dodecyloxy group, methoxyethoxy group, ethoxyethoxy group, 3-methoxypropyloxy group and 3-(iso-propyloxy)propyloxy group;

substituted and unsubstituted alkenyl groups having 20 or less carbon atoms such as a vinyl group, propenyl group, 1-butenyl group, iso-butenyl group, 1-pentenyl group, 2-pentenyl group, 2-methyl-1-butenyl group, 3-methyl-1-butenyl group, 2-methyl-2-butenyl group, 2,2-dicyanovinyl group, 2-cyano-2-methylcarboxyvinyl group and 2-cyano-2-methylsulfonevinyl group;

substituted and unsubstituted acyl groups having 20 or less carbon atoms such as a formyl group, acetyl group, ethylcarbonyl group, n-propylcarbonyl group, iso-propylcarbonyl group, n-butylcarbonyl group, n-pentylcarbonyl group, iso-pentylcarbonyl group, neo-pentylcarbonyl group, 2-methylbutylcarbonyl group and nitrobenzylcarbonyl group;

substituted and unsubstituted alkoxycarbonyl groups having 20 or less carbon atoms such as a methoxycarbonyl group, ethoxycarbonyl group, isopropyloxycarbonyl group and 2,4-dimethylbutyloxycarbonyl group; and substituted and unsubstituted aralkyl groups having 20 or less carbon atoms such as a benzyl group, nitrobenzyl groups, cyanobenzyl groups, hydroxybenzyl groups, methylbenzyl groups, dimethylbenzyl group, trimethylbenzyl group, dichlorobenzyl group, methoxybenzyl groups, ethoxybenzyl groups, trifluoromethylbenzyl groups, naphthylmethyl group, nitronaphthylmethyl groups, cyanonaphthylmethyl groups, hydroxynaphthylmethyl groups, methylnaphthylmethyl groups and trifluoromethylnaphthylmethyl groups;

the aryl groups; and the heteroaryl groups mentioned above.

Typical examples of $R_2$ to $R_8$ include a hydrogen atom; halogen atoms such as fluorine, chlorine, bromine and iodine;

and the alkyl groups, the alkoxy groups, the alkenyl groups, the acyl groups, the alkoxycarbonyl groups, the aralkyl groups, the aryl groups and the heteroaryl groups mentioned above.

In the dipyrromethene metal chelate compound represented by formula (2), $R_{11}$ to $R_{17}$ are each independently a hydrogen atom, a halogen atom, a nitro group, a cyano group, a hydroxyl group, an amino group, a carboxyl group, a sulfonic acid group, or a substituted or unsubstituted alkyl, alkoxy, alkylthio, aryloxy, arylthio, alkenyl, acyl, alkoxycarbonyl, carbamoyl, acylamino, aralkyl, aryl or heteroaryl group having 20 or less carbon atoms. Here, $R_{15}$ and $R_{16}$ may be bonded to each other to form an aromatic ring which may have a substituent or substituents.

Examples of the halogen atom, the alkyl group, the alkoxy group, the alkenyl group, the acyl group, the alkoxycarbonyl group, the aralkyl group, the aryl group and the heteroaryl group include those which are mentioned above.

Furthermore, typical examples of the alkylthio group represented by $R_{11}$ to $R_{17}$ include alkylthio groups such as a methylthio group, ethylthio group, n-propylthio group, iso-propylthio group, n-butylthio group, iso-butylthio group, sec-butylthio group, t-butylthio group, n-pentylthio group, iso-pentylthio group, 2-methylbutylthio group, 1-methylbutylthio group, neo-pentylthio group, 1,2-dimethylpropylthio group and 1,1-dimethylpropylthio group;

typical examples of the aryloxy group represented by $R_{11}$ to $R_{17}$ include aryloxy groups such as a phenoxy group, 2-methylphenoxy group, 4-methylphenoxy group, 4-t-butylphenoxy group, 2-methoxyphenoxy group and 4-isopropylphenoxy group;

typical examples of the arylthio group represented by $R_{11}$ to $R_{17}$ include arylthio groups such as a phenylthio group, 4-methylphenylthio group, 2-methoxyphenylthio group and 4-t-butylphenylthio group;

typical examples of the acylamino group represented by $R_{11}$ to $R_{17}$ include acylamino groups such as an acetylamino group, ethylcarbonylamino group, butylcarbonylamino group, phenylcarbonylamino group, 4-ethylphenylcarbonylamino group and 3-butylphenylcarbonylamino group;

and typical examples of the carbamoyl group represented by $R_{11}$ to $R_{17}$ include alkylaminocarbonyl groups such as a methylaminocarbonyl group, ethylaminocarbonyl group, n-propylaminocarbonyl group, n-butylaminocarbonyl group and n-hexylaminocarbonyl group, and phenylaminocarbonyl groups such as a phenylaminocarbonyl group, 4-methylphenylaminocarbonyl group, 2-methoxyphenylaminocarbonyl group and 4-n-propyl-phenylaminocarbonyl group.

In the dipyrromethene metal chelate compound represented by formula (3), $R_{19}$ to $R_{25}$ are each independently a hydrogen atom, a halogen atom, a nitro group, a cyano group, a hydroxyl group, an amino group, a carboxyl group, a sulfonic acid group, or a substituted or unsubstituted alkyl, alkoxy, alkylthio, aryloxy, arylthio, alkenyl, acyl, alkoxycarbonyl, carbamoyl, acylamino or aralkyl group having 20 or less carbon atoms. $R_{18}$ and $R_{26}$ are each independently an alkenyl group or an aryl group. Typical examples thereof include the above-mentioned groups.

In the dipyrromethene metal chelate compound represented by formula (4), $R_{27}$ to $R_{35}$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms. Typical examples thereof include the above-mentioned groups.

No particular restriction is put on typical examples of M, M' and M''', so long as they are transition metals having an ability to form a chelate with the dipyrromethene compound, but examples thereof include metals in the groups 8, 9 and 10 (the group VIII), the group 11 (the group Ib), the group 12 (the group IIb), the group 3 (the group IIIa), the group 4 (the group IVa), the group 5 (the group Va), the group 6 (the group VIa) and the group 7 (the group VIIa) of the periodic table. Preferable examples thereof include nickel, cobalt, iron, ruthenium, rhodium, palladium, copper, osmium, iridium, platinum and zinc, and from the viewpoint of light resistance, particularly preferable examples include copper and cobalt.

A method for preparing the dipyrromethene metal chelate compound represented by formula (1) of the present invention is not restricted, but for example, this compound can be prepared in accordance with any of methods described in Aust. J. Chem., Vol. 11, p. 1835–45 (1965), Heteroatom Chemistry, Vol. 1, No. 5, p. 389 (1990), U.S. Pat. Nos. 4,774,339 and 5,433,896. Typically, the dipyrromethene metal chelate compound can be prepared by the following two step reactions.

In the first step, a compound represented by formula (5) and a compound represented by formula (6), or a compound represented by formula (7) and a compound represented by formula (8) are reacted in the presence of an acid catalyst such as hydrobromic acid or hydrochloric acid in a suitable solvent, thereby obtaining a dipyrromethene compound represented by formula (9). Next, in the second step, the dipyrromethene compound of formula (9) is reacted with an acetate or a halide of a metal such as nickel, cobalt, iron, ruthenium, rhodium, palladium, copper, osmium, iridium, platinum or zinc to obtain the dipyrromethene metal chelate compound represented by formula (1). Each of the compounds of formulae (2) to (4) can also be obtained by suitably altering substituents in a similar manner:

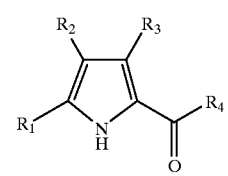

(5)

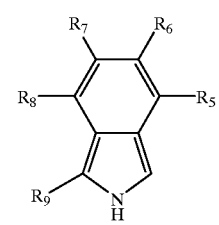

(6)

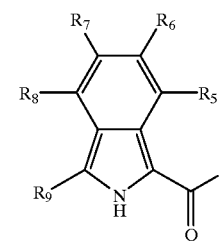

(7)

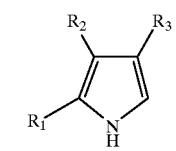

(8)

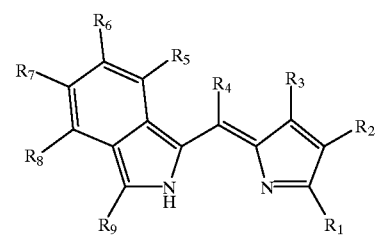

(9)

wherein $R_1$ and $R_9$ are as defined above.

Preferable typical examples of the dipyrromethene metal chelate compounds represented by formulae (1) to (3) of the present invention include compounds having substituents shown in Tables 1 to 3, respectively.

TABLE 1
| Comp. No. | R₁ | R₂ | R₃ | R₄ | R₅ | R₆ | R₇ | R₈ | R₉ | M |
|---|---|---|---|---|---|---|---|---|---|---|
| I-1 |  Ph | H | 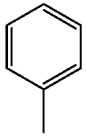 Ph | H | H | H | H | H | 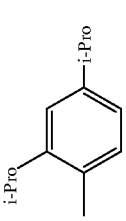 2,4-di-i-Pro-Ph | Cu |
| I-2 |  Ph | Br | 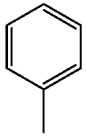 Ph | H | H | H | H | H | 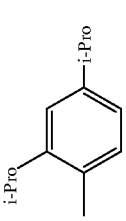 2,4-di-i-Pro-Ph | Cu |
| I-3 |  Ph | H | 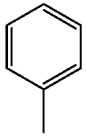 Ph | H | H | H | H | H | 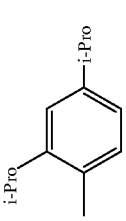 2,4-di-i-Pro-Ph | Zn |
| I-4 | 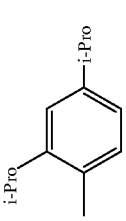 CH=CH-Ph | H | H | H | H | H | H | H | 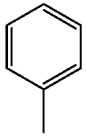 2,4-di-i-Pro-Ph | Cu |
| I-5 | Ph | H | Ph | H | H | H | H | H | Ph | Cu |
| I-6 | Ph | Cl | Ph | H | H | Br | H | H | 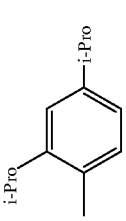 2,4-di-i-Pro-Ph | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-7 | 4-t-Bu-phenyl-CH=CH-CH₂- | H | H | H | H | H | H | H | 3,5-dimethyl-4-t-Bu-2,6-dimethylphenyl (H₃C, t-Bu, H₃C substituted) | Cu |
| I-8 | 7-methyl-2-naphthyl | H | -C(CH₃)₃ | H | H | H | H | H | 2-i-Pro-4-methylphenyl (i-Pro, i-Pro) | Cu |
| I-9 | phenyl-CH=CH-CH₂- | H | H | H | H | Br | H | H | 2-i-Pro-4-methylphenyl (i-Pro, i-Pro) | Cu |
| I-10 | phenyl-CH=CH-CH₂- (cis) | H | H | H | H | H | H | H | 2-i-Pro-4-methylphenyl (i-Pro, i-Pro) | Cu |
| I-11 | phenyl-CH=CH-CH₂- | H | Br | H | H | H | H | H | 2-i-Pro-4-methylphenyl (i-Pro, i-Pro) | Cu |
| I-12 | CH₃-CH=CH-CH₂- | H | H | H | H | Br | H | H | 2-i-Pro-4-methylphenyl (i-Pro, i-Pro) | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-13 | phenyl-propenyl (cis) | H | Br | H | H | H | H | H | 2-i-Pro, 5-i-Pro phenyl with methyl | Cu |
| I-14 | 2-methylnaphthyl | H | —C(CH₃)₃ | H | H | Br | H | H | 2-i-Pro, 5-i-Pro phenyl with methyl | Cu |
| I-15 | phenyl | —C₂H₅ | —C(CH₃)₃ | H | H | Br | H | H | 4-CH₃-phenyl | Cu |
| I-16 | 4-t-Bu-phenyl-propenyl | H | Br | H | H | H | H | H | 2-i-Pro, 5-i-Pro phenyl with methyl | Cu |
| I-17 | 2-furyl-propenyl | H | H | H | H | Br | H | H | 2-i-Pro, 5-i-Pro phenyl with methyl | Cu |
| I-18 | phenyl-propenyl (cis) | H | H | H | H | Br | H | H | 2-i-Pro, 5-i-Pro phenyl with methyl | Cu |
| I-19 | phenyl-propenyl (trans) | H | H | H | H | H | Br | H | 2-i-Pro, 5-i-Pro phenyl with methyl | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-20 | trans-propenyl-phenyl | H | H | —CH₃ | H | Br | H | H | 2-i-Pro-3-methyl-5-i-Pro-phenyl (2-i-Pro, methyl, i-Pro substituted phenyl) | Cu |
| I-21 | phenyl | H | phenyl | H | H | t-Bu | H | H | phenyl | Cu |
| I-22 | 4-C₄H₉-phenyl | H | 4-C₄H₉-phenyl | H | H | H | H | H | 4-CH₃-phenyl | Cu |
| I-23 | phenyl | —C₂H₅ | phenyl | H | H | H | H | H | 2-i-Pro-3-methyl-5-i-Pro-phenyl | Cu |
| I-24 | 4-C₄H₉-phenyl | H | 4-C₄H₉-phenyl | H | H | H | H | H | 2-i-Pro-3-methyl-5-i-Pro-phenyl | Cu |
| I-25 | phenyl | —C₂H₅ | phenyl | H | H | H | H | H | 4-CH₃-phenyl | Cu |
| I-26 | phenyl | H | phenyl | H | H | Cl | Cl | H | 2-i-Pro-3-methyl-5-i-Pro-phenyl | Cu |

TABLE 1-continued
| Comp. No. | $R_1$ | $R_2$ | $R_3$ | $R_4$ | $R_5$ | $R_6$ | $R_7$ | $R_8$ | $R_9$ | M |
|---|---|---|---|---|---|---|---|---|---|---|
| I-27 |  | H |  | H | H | Br | H | H |  | Cu |
| I-28 |  | H |  | H | H | -OBu | H | H |  | Cu |
| I-29 |  | H |  | H | H | Cl | Cl | H |  | Cu |
| I-30 |  | H |  | H | H | H | H | H |  | Cu |
| I-31 |  | H |  | H | H | H | H | H |  | Co |
| I-32 |  | H | —C(CH$_3$)$_3$ | H | H | H | H | H |  | Cu |
| I-33 |  | H |  | H | H | H | H | H |  | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-34 | Ph | H | —C(CH₃)₃ | H | H | H | H | H | 2,5-di-i-Pro-phenyl | Cu |
| I-35 | Ph | H | Ph | H | H | H | H | H | 2-(Et)₂N-5-i-Pro-phenyl | Cu |
| I-36 | Ph | —(CH₂)₂CH(CH₃)₂ | Ph | H | H | H | H | H | 4-CH₃-phenyl | Cu |
| I-37 | Ph | —(CH₂)₂CH(CH₃)₂ | Ph | H | H | H | H | H | 2,5-di-i-Pro-phenyl | Cu |
| I-38 | Ph | H | —C(CH₃)₃ | H | H | Br | H | H | 2,5-di-i-Pro-phenyl | Cu |
| I-39 | Ph | H | Ph | H | H | Cl | H | H | 2,5-di-i-Pro-phenyl | Cu |
| I-40 | Ph | H | H | H | H | Br | H | H | 2,5-di-i-Pro-phenyl | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-41 | 4-methylphenyl | H | phenyl(methyl) | H | H | H | H | H | 4-bromo-2-methylphenyl(n-C₆H₁₃) | Cu |
| I-42 | 4-bromophenyl | H | phenyl(methyl) | H | H | Br | H | H | 2-methyl-5-isopropylphenyl(i-Pro) | Cu |
| I-43 | 4-butoxyphenyl | H | 4-butoxyphenyl(methyl) | H | H | Br | H | H | 2-methyl-5-isopropylphenyl(i-Pro) | Cu |
| I-44 | 4-bromophenyl | H | —C(CH₃)₃ | H | H | H | H | H | 2-methyl-5-isopropylphenyl(i-Pro) | Cu |
| I-45 | 4-bromophenyl | H | —C(CH₃)₃ | H | H | Cl | H | H | 2-methyl-5-isopropylphenyl(i-Pro) | Cu |
| I-46 | 4-methylphenyl | H | —C(CH₃)₃ | H | H | Cl | H | H | 2-methyl-5-isopropylphenyl(i-Pro) | Cu |

TABLE 1-continued

| Comp. No. | $R_1$ | $R_2$ | $R_3$ | $R_4$ | $R_5$ | $R_6$ | $R_7$ | $R_8$ | $R_9$ | M |
|---|---|---|---|---|---|---|---|---|---|---|
| I-47 | 4-Br-C$_6$H$_4$- | H | —C(CH$_3$)$_3$ | H | H | Br | H | H | 3-i-Pro,4-i-Pro-C$_6$H$_3$- | Cu |
| I-48 | 4-Br-C$_6$H$_4$- | H | 4-Br-C$_6$H$_4$- | H | H | H | H | H | 3-i-Pro,4-i-Pro-C$_6$H$_3$- | Cu |
| I-49 | 4-Br-C$_6$H$_4$- | H | 4-Br-C$_6$H$_4$- | H | H | Br | H | H | 3-i-Pro,4-i-Pro-C$_6$H$_3$- | Cu |
| I-50 | C$_6$H$_5$- | H | —CH$_3$ | H | H | Br | H | H | 3-i-Pro,4-i-Pro-C$_6$H$_3$- | Cu |
| I-51 | 4-Br-C$_6$H$_4$- | H | H | H | H | H | H | H | 3-i-Pro,4-i-Pro-C$_6$H$_3$- | Cu |
| I-52 | C$_6$H$_5$- | H | C$_6$H$_5$- | H | H | H | Br | H | 3-i-Pro,4-i-Pro-C$_6$H$_3$- | Cu |
| I-53 | C$_6$H$_5$- | H | H | H | H | Br | H | H | 4-n-C$_5$H$_{11}$-C$_6$H$_4$- | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-54 | 4-OCH₃-C₆H₄- | H | H | H | H | Br | H | H | 2-(i-Pro)-4-(i-Pro)-methylphenyl | Cu |
| I-55 | 4-Br-C₆H₄- | H | H | H | H | Br | H | H | 2-(i-Pro)-4-(i-Pro)-methylphenyl | Cu |
| I-56 | -CH=CH-CH₃ | H | -CH₃ | H | H | H | H | H | phenyl(methyl) | Co |
| I-57 | -CH=CH-CH₃ | H | -CH₃ | H | H | H | H | H | 4-OMe-methylphenyl | Co |
| I-58 | 4-(t-Bu)-C₆H₄-CH=CH- | H | H | H | H | H | H | H | 2-(i-Pro)-4-(i-Pro)-methylphenyl | Cu |
| I-59 | -CH=CH-CH₃ | H | -CH₃ | H | H | H | H | H | phenyl(methyl) | Zn |
| I-60 | -CH=CH-CH₃ | -C₂H₅ | -CH₃ | H | H | H | H | H | phenyl(methyl) | Co |

TABLE 1-continued

| Comp. No. | R$_1$ | R$_2$ | R$_3$ | R$_4$ | R$_5$ | R$_6$ | R$_7$ | R$_8$ | R$_9$ | M |
|---|---|---|---|---|---|---|---|---|---|---|
| I-61 | —CH$_3$ (allyl) | —C$_2$H$_5$ | —CH$_3$ | H | H | H | H | H | phenyl | Zn |
| I-62 | —CO$_2$C$_2$H$_5$ (allyl) | —C$_2$H$_5$ | —C$_2$H$_5$ | H | H | H | H | H | 4-Et-phenyl | Fe |
| I-63 | phenyl (allyl) | —C$_2$H$_5$ | —C$_2$H$_5$ | H | H | H | H | H | 2-i-Pro-4-i-Pro-phenyl | Cu |
| I-64 | —CO$_2$C$_2$H$_5$ (allyl) | -n-C$_6$H$_{13}$ | —CO$_2$C$_2$H$_5$ | H | H | H | H | H | 4-NMe$_2$-phenyl | Zn |
| I-65 | phenyl (allyl) | H | H | H | H | H | H | H | 2-i-Pro-4-i-Pro-phenyl | Co |
| I-66 | —CH$_3$ (allyl) | —C$_2$H$_5$ | phenyl | H | H | —OCH$_3$ | —OCH$_3$ | H | 4-t-Bu-phenyl | Ni |
| I-67 | —Br (allyl) | —CH$_3$ | —CO$_2$C$_2$H$_5$ | H | —OCH$_3$ | —OCH$_3$ | —OCH$_3$ | —OCH$_3$ | phenyl | Fe |
| I-68 | —OCH$_3$ (allyl) | —CH$_3$ | —C$_2$H$_5$ | H | H | H | Cl | H | phenyl | Fe |

TABLE 1-continued
| Comp. No. | R₁ | R₂ | R₃ | R₄ | R₅ | R₆ | R₇ | R₈ | R₉ | M |
|---|---|---|---|---|---|---|---|---|---|---|
| I-69 | 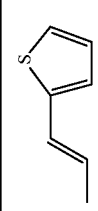 | H | H | H | H | H | H | H |  | Cu |
| I-70 |  | H | H | H | H | H | H | H |  | Zn |
| I-71 | —CH=CH₂ | —CH=CH₂ | H | H | H | H | H | H |  | Zn |
| I-72 |  | H | H | H | H | H | H | H |  | Zn |
| I-73 |  | H | H | H | H | H | H | H |  | Cu |
| I-74 | 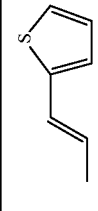 | H | H | H | H | H | H | H |  | Cu |
| I-75 |  | —CH₃ | —CH₃ | H | H | H | H | H |  | Cu |

TABLE 1-continued
| Comp. No. | R₁ | R₂ | R₃ | R₄ | R₅ | R₆ | R₇ | R₈ | R₉ | M |
|---|---|---|---|---|---|---|---|---|---|---|
| I-76 | 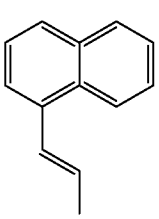 | —C₂H₅ | —C₂H₅ | H | H | H | H | H | 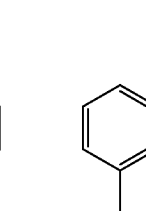 | Cu |
| I-77 | 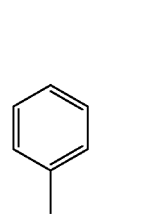 | H | 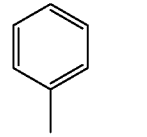 | H | H | Br | H | H | 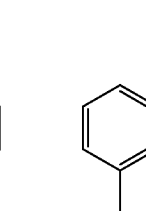 | Co |
| I-78 | 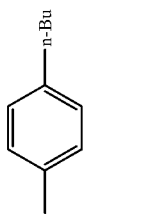 | H | 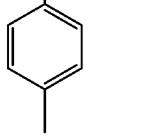 | H | H | Cl | Cl | H | 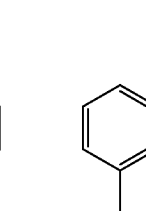 | Co |
| I-79 | 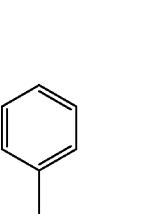 | Br | 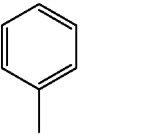 | H | H | H | H | H | 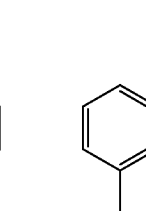 | Co |
| I-80 | 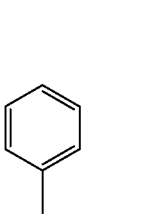 | Cl | 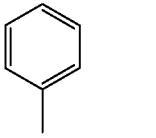 | H | H | H | H | H | 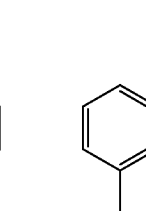 | Co |
| I-81 | 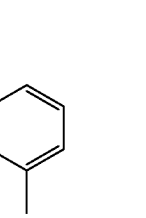 | H | 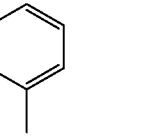 | H | H | Cl | H | H | 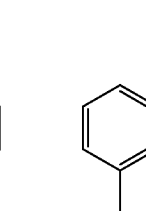 | Co |

TABLE 1-continued

| Comp. No. | R$_1$ | R$_2$ | R$_3$ | R$_4$ | R$_5$ | R$_6$ | R$_7$ | R$_8$ | R$_9$ | M |
|---|---|---|---|---|---|---|---|---|---|---|
| I-82 | 4-Br-C$_6$H$_4$- | H | 4-Br-C$_6$H$_4$- | H | H | H | H | H | 2-i-Pr-4-i-Pr-C$_6$H$_3$- | Co |
| I-83 | 4-n-Bu-C$_6$H$_4$- | H | 4-n-Bu-C$_6$H$_4$- | H | I | I | I | I | 3,5-Me$_2$-4-t-Bu-C$_6$H$_2$- | Cu |
| I-84 | 4-n-Bu-C$_6$H$_4$- | H | 4-n-Bu-C$_6$H$_4$- | H | Br | Br | Br | Br | 3,5-Me$_2$-4-t-Bu-C$_6$H$_2$- | Cu |
| I-85 | 4-n-Bu-C$_6$H$_4$- | H | 4-n-Bu-C$_6$H$_4$- | H | Cl | Cl | Cl | Cl | 3,5-Me$_2$-4-t-Bu-C$_6$H$_2$- | Cu |
| I-86 | C$_6$H$_5$- | H | C$_6$H$_5$- | H | F | F | F | F | 2-i-Pr-4-i-Pr-C$_6$H$_3$- | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-87 | Ph | H | Ph | H | Cl | H | H | Cl | 2,4-di-i-Pr-phenyl | Cu |
| I-88 | Ph | H | Ph | H | F | H | H | F | 2,4-di-i-Pr-phenyl | Cu |
| I-89 | 4-OBu-phenyl | Cl | 4-OBu-phenyl | H | H | H | H | H | Ph | Cu |
| I-90 | Ph | Br | Ph | H | H | H | H | H | 2-Me-5-NEt₂-phenyl | Cu |
| I-91 | Ph | H | 2,4-di-i-Pr-phenyl | H | H | Br | H | H | Ph | Cu |
| I-92 | Ph | H | 2,4-di-i-Pr-phenyl | H | H | Br | H | H | Ph | Co |

TABLE 1-continued
| Comp. No. | R₁ | R₂ | R₃ | R₄ | R₅ | R₆ | R₇ | R₈ | R₉ | M |
|---|---|---|---|---|---|---|---|---|---|---|
| I-93 |  | Cl |  | H | H | —OC₅H₁₁ | H | H |  2,4-(i-Pr)₂ | Cu |
| I-94 | 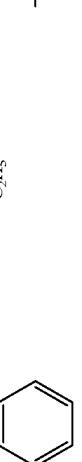 | —C₂H₅ |  | H | Cl | H | H | Cl |  4-Me | Cu |
| I-95 |  | Cl |  | H | H | —C(CH₃)₃ | H | H |  | Cu |
| I-96 |  | —COCH₃ |  | H | H | Br | H | H |  4-N(n-Bu)₂ | Co |
| I-97 |  | —CO₂C₂H₅ |  | H | H | Cl | H | H |  2,4-(i-Pr)₂ | Cu |
| I-98 |  | Cl |  | H | H | —OCH₃ | —OCH₃ | H |  4-Br | Cu |
| I-99 |  | —CH=CH₂ |  | —CH₃ | H | Cl | Cl | H |  2,4-Cl₂ | Cu |

TABLE 1-continued
| Comp. No. | R$_1$ | R$_2$ | R$_3$ | R$_4$ | R$_5$ | R$_6$ | R$_7$ | R$_8$ | R$_9$ | M |
|---|---|---|---|---|---|---|---|---|---|---|
| I-100 | 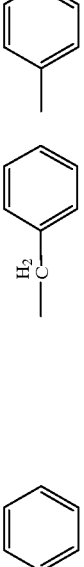 |  |  | H | H | Cl | H | H |  | Cu |
| I-101 |  | H | 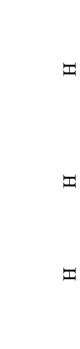 | H | H | H | H | H |  | Cu |
| I-102 |  | H | —C(CH$_3$)$_3$ | H | H | Br | H | H | 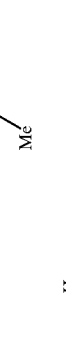 | Co |
| I-103 |  | H | —CH$_3$ | H | H | Br | H | H |  | Cu |
| I-104 |  | H | —C(CH$_3$)$_3$ | H | H | H | H | H |  | Cu |
| I-105 |  | H | —C(CH$_3$)$_3$ | H | H | H | H | H |  | Cu |
| I-106 |  | H | —C(CH$_3$)$_3$ | H | H | H | H | H |  | Co |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-107 | 1-naphthyl | H | —C(CH₃)₃ | H | H | H | H | H | 2-(i-Pr)-3-(i-Pr)-6-methylphenyl | Cu |
| I-108 | 1-naphthyl | H | —C(CH₃)₃ | H | H | Br | H | H | 2-(i-Pr)-3-(i-Pr)-6-methylphenyl | Cu |
| I-109 | phenyl | —C₂H₅ | —C(CH₃)₃ | H | H | Br | Br | H | 2-(i-Pr)-3-(i-Pr)-6-methylphenyl | Cu |
| I-110 | 2-methyl-5-methyl-1,3,4-thiadiazolyl | —C₂H₅ | —C₂H₅ | H | H | H | H | H | 2-(i-Pr)-3-(i-Pr)-6-methylphenyl | Cu |
| I-111 | 2-methyl-5-methyl-1,3,4-thiadiazolyl | —C₂H₅ | —C₂H₅ | H | H | H | H | H | 2-(i-Pr)-3-(i-Pr)-6-methylphenyl | Cu |
| I-112 | 2-methylbenzoxazolyl | H | H | | | | | | 2,6-dimethyl-3-methyl-5-(t-Bu)phenyl | Cu |

TABLE 1-continued
| Comp. No. | R$_1$ | R$_2$ | R$_3$ | R$_4$ | R$_5$ | R$_6$ | R$_7$ | R$_8$ | R$_9$ | M |
|---|---|---|---|---|---|---|---|---|---|---|
| I-113 |  | H | H | H | H | H | H | H | 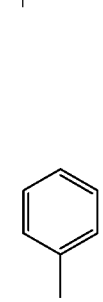 2,4-di-i-Pr-phenyl | Cu |
| I-114 | phenyl | —OCH$_3$ | H | H | H | H | H | H | 3,5-di-Me-4-t-Bu-phenyl | Cu |
| I-115 | phenyl | Cl | H | H | H | H | H | H | 3,5-di-Me-4-t-Bu-phenyl | Co |
| I-116 | phenyl | —CH$_3$ | —CH$_3$ | H | H | H | H | H | 4-N(Et)$_2$-phenyl | Co |
| I-117 | phenyl | H | —O$_2$C-phenyl | H | H | H | H | H | 3,5-di-Me-4-t-Bu-phenyl | Co |
| I-118 | phenyl | —OC$_2$H$_5$ | —OC$_2$H$_5$ | H | H | H | H | H | 4-n-Bu-phenyl | Co |

TABLE 1-continued

| Comp. No. | R1 | R2 | R3 | R4 | R5 | R6 | R7 | R8 | R9 | M |
|---|---|---|---|---|---|---|---|---|---|---|
| I-119 |  phenyl | —OC<sub>6</sub>H<sub>5</sub> (phenoxy) | —CH<sub>3</sub> | H | H | H | H | H | 2,4-di-i-Pr-phenyl (with Me) | Co |
| I-120 | phenyl | —C<sub>4</sub>H<sub>9</sub> | H | H | Br | H | H | H | 3,5-di-Me-4-t-Bu-phenyl | Cu |
| I-121 | phenyl | —CH<sub>2</sub>C<sub>6</sub>H<sub>5</sub> | H | H | H | H | H | H | 3,5-di-Me-4-t-Bu-phenyl | Co |
| I-122 | phenyl | H | —C(CH<sub>3</sub>)<sub>3</sub> | H | H | H | H | H | 3,5-di-Me-4-t-Bu-phenyl | Co |
| I-123 | 2,5-di-Me-pyrrolyl | H | 2,5-di-Me-pyrrolyl | H | H | H | H | H | 2,4-di-i-Pr-phenyl | Cu |
| I-124 | 2-Me-furyl | —C<sub>2</sub>H<sub>5</sub> | 2-Me-furyl | H | H | H | H | H | 2,4-di-i-Pr-phenyl | Cu |

TABLE 1-continued

| Comp. No. | R$_1$ | R$_2$ | R$_3$ | R$_4$ | R$_5$ | R$_6$ | R$_7$ | R$_8$ | R$_9$ | M |
|---|---|---|---|---|---|---|---|---|---|---|
| I-125 | 4-methyl-1H-imidazol-2-yl | H | 4-methyl-1H-imidazol-2-yl | H | H | H | H | H | 2-methyl-4-(i-Pr)-6-(i-Pr)phenyl | Co |
| I-126 | 5-methylthiophen-2-yl | H | 5-methylthiophen-2-yl | H | H | H | H | H | 2-methyl-4-(i-Pr)-6-(i-Pr)phenyl | Cu |
| I-127 | 2-methyloxazol-5-yl | H | 2-methyloxazol-5-yl | H | H | H | H | H | 2-methyl-4-(i-Pr)-6-(i-Pr)phenyl | Cu |
| I-128 | pyridin-4-yl | H | H | H | H | H | H | H | 3,5-dimethyl-4-(t-Bu)phenyl | Co |
| I-129 | 2-methylbenzoxazol-5-yl | H | 2-methylbenzoxazol-5-yl | H | H | —OCH$_3$ | —OCH$_3$ | H | 4-ethylphenyl | Cu |
| I-130 | 4-ethoxy-3-methylphenyl | H | 4-ethoxy-3-methylphenyl | H | H | H | H | H | 3,5-dimethyl-4-(t-Bu)phenyl | Cu |

TABLE 1-continued

| Comp. No. | R₁ | R₂ | R₃ | R₄ | R₅ | R₆ | R₇ | R₈ | R₉ | M |
|---|---|---|---|---|---|---|---|---|---|---|
| I-131 | 2-benzimidazolyl | —C₂H₅ | 2-benzimidazolyl | H | H | H | H | H | 2,4-di-i-Pr-phenyl | Cu |
| I-132 | 4-t-Bu-phenyl | H | 4-t-Bu-phenyl | H | H | H | H | H | phenyl | Cu |
| I-133 | 4-NEt₂-phenyl | H | 4-NEt₂-phenyl | H | H | H | H | H | —CH₃ | Co |
| I-134 | 2-benzofuranyl | H | 2-benzofuranyl | H | H | H | H | H | 4-Et-phenyl | Co |
| I-135 | 5-Me-2-furyl | H | 5-Me-2-furyl | H | H | H | H | H | phenyl | Co |
| I-136 | 1,5-diMe-pyrrolyl | -n-C₆H₁₃ | 1,5-diMe-pyrrolyl | H | —OCH₃ | —OCH₃ | —OCH₃ | —OCH₃ | phenyl | Cu |
| I-137 | 2-indolyl | —CH=CH₂ | 2-indolyl | H | H | H | H | H | 4-NEt₂-phenyl | Cu |
| I-138 | 4-pyridyl | —CO₂C₂H₅ | 4-pyridyl | H | H | H | H | H | —C₂H₅ | Co |

TABLE 1-continued
| Comp. No. | R$_1$ | R$_2$ | R$_3$ | R$_4$ | R$_5$ | R$_6$ | R$_7$ | R$_8$ | R$_9$ | M |
|---|---|---|---|---|---|---|---|---|---|---|
| I-139 | 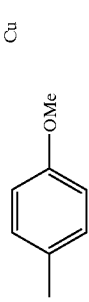 | H | 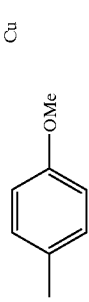 | H | H | H | H | H |  | Cu |
| I-140 | 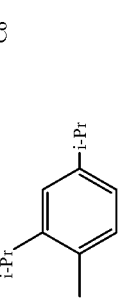 | H | 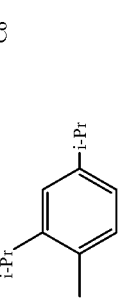 | H | H | H | H | H | 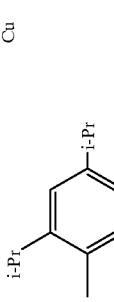 | Co |
| I-141 |  | —COCH$_3$ |  | H | H | H | H | H | —C$_2$H$_5$ | Cu |
| I-142 |  | H | 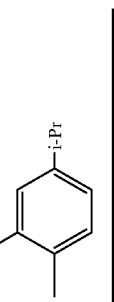 | H | H | H | H | H | 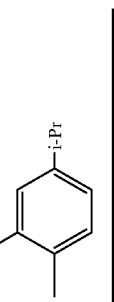 | Cu |

TABLE 2

| Comp. No. | R₁₁ | R₁₂ | R₁₃ | R₁₄ | R₁₅ | R₁₆ | R₁₇ | M |
|---|---|---|---|---|---|---|---|---|
| 2-1 | 2,4,6-trimethylbenzyl (–CH₂–C₆H₂(CH₃)₃) | H | H | 2,4,6-trimethylbenzyl (–CH₂–C₆H₂(CH₃)₃) | H | H | H | Zn |
| 2-2 | 2,6-dichlorobenzyl (–CH₂–C₆H₃Cl₂) | H | H | 2,6-dichlorobenzyl (–CH₂–C₆H₃Cl₂) | H | H | H | Zn |
| 2-3 | —CH₃ | —C₂H₅ | —CH₃ | H | —CH₃ | —C₂H₅ | —CH₃ | Zn |
| 2-4 | —CH₃ | —CH₃ | —C₂H₅ | H | —C₂H₅ | —CH₃ | —CH₃ | Zn |
| 2-5 | —CH₃ | —C₂H₅ | —CH₃ | 2,4,6-trimethylbenzyl (–CH₂–C₆H₂(CH₃)₃) | —CH₃ | —C₂H₅ | —CH₃ | Co |
| 2-6 | 2-(trifluoromethyl)benzyl (–CH₂–C₆H₄–CF₃) | H | H | H | H | H | H | Zn |
| 2-7 | —CH₃ | —C₂H₅ | —CH₃ | –C₆H₅ | —CH₃ | —C₂H₅ | —CH₃ | Zn |
| 2-8 | —CH₃ | —C₂H₅ | —CH₃ | –C₆H₅ | —CH₃ | —C₂H₅ | —CH₃ | Co |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-9 | —CH$_3$ | —C$_2$H$_5$ | —CH$_3$ | -tolyl | —CH$_3$ | —C$_2$H$_5$ | —CH$_3$ | Ni |
| 2-10 | —CH$_3$ | —C$_2$H$_5$ | -phenyl | H | -phenyl | —C$_2$H$_5$ | —CH$_3$ | Zn |
| 2-11 | —CH$_3$ | —C$_2$H$_5$ | -phenyl | H | -phenyl | —C$_2$H$_5$ | —CH$_3$ | Co |
| 2-12 | —CH$_3$ | —C$_2$H$_5$ | -phenyl | H | -phenyl | —C$_2$H$_5$ | —CH$_3$ | Ni |
| 2-13 | —CH$_3$ | —C$_2$H$_5$ | -tolyl | H | -tolyl | —C$_2$H$_5$ | —CH$_3$ | Cu |
| 2-14 | —CH$_3$ | —C$_2$H$_5$ | —CH$_3$ | mesityl | —CH$_3$ | —C$_2$H$_5$ | —CH$_3$ | Co |
| 2-15 | —CO$_2$C$_2$H$_5$ | —C$_2$H$_5$ | —C$_2$H$_5$ | mesityl | —C$_2$H$_5$ | —C$_2$H$_5$ | —CO$_2$C$_2$H$_5$ | Co |
| 2-16 | -(4-C$_4$H$_9$-phenyl) | H | -(4-C$_4$H$_9$-phenyl) | H | -(4-C$_4$H$_9$-phenyl) | H | -(4-C$_4$H$_9$-phenyl) | Cu |
| 2-17 | -phenyl | —C$_2$H$_5$ | -phenyl | H | -phenyl | —C$_2$H$_5$ | -phenyl | Cu |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-18 | —CH$_3$ | H | —CH$_3$ | H | —CH=CH— | —CH=CH— | phenyl | Co |
| 2-19 | —CH$_3$ | H | —CH$_3$ | H | —CH=CH— | —CH=CH— | 4-methyl-2-methoxyphenyl | Co |
| 2-20 | —CH$_3$ | H | —CH$_3$ | H | —CH=CH— | —CH=CH— | phenyl | Zn |
| 2-21 | —CH$_3$ | H | —CH$_3$ | H | —CH=CH— | —CH=CH— | 4-t-Bu-phenyl-S-(4-methylphenyl) | Co |
| 2-22 | —CH$_3$ | —C$_2$H$_5$ | —CH$_3$ | H | —CH=CH— | —CH=CH— | phenyl | Co |
| 2-23 | —CH$_3$ | —C$_2$H$_5$ | —CH$_3$ | H | —CH=CH— | —CH=CH— | phenyl | Zn |
| 2-24 | —CH$_3$ | —C$_2$H$_5$ | —CH$_3$ | H | —CH=CH— | —CH=CH— | 4-C$_2$H$_5$-phenyl-methyl | Zn |
| 2-25 | —CH$_3$ | H | —CH$_3$ | H | —CH=CH— | —CH=CH— | 4-t-Bu-phenyl-S-(4-methylphenyl) | Zn |
| 2-26 | —CH$_3$ | —C$_2$H$_5$ | —CH$_3$ | H | —CH=CH— | —CH=CH— | 4-C$_2$H$_5$-phenyl-methyl | Ni |
| 2-27 | —CH$_3$ | —C$_2$H$_5$ | —CH$_3$ | H | —CH=CH— | —CH=CH— | 4-C$_2$H$_5$-phenyl-methyl | Co |
| 2-28 | —CH$_3$ | —C$_2$H$_5$ | —CH$_3$ | H | —CH=CH— | —CH=CH— | 4-cyclohexyl-phenyl-methyl | Co |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-29 | —CH$_3$ | —C$_2$H$_5$ | —CH$_3$ | H | —CH=CH—CH=CH— | | 4-cyclohexylphenyl | Zn |
| 2-30 | —CH$_3$ | —C$_2$H$_5$ | —CH$_3$ | H | —CH=CH—CH=CH— | | 4-[(CH$_2$)$_2$CH(CH$_3$)$_2$]phenyl | Zn |
| 2-31 | —CH$_3$ | —C$_2$H$_5$ | —CH$_3$ | H | —CH=CH—CH=CH— | | 4-[(CH$_2$)$_2$CH(CH$_3$)$_2$]phenyl | Co |
| 2-32 | —CH$_3$ | —C$_2$H$_5$ | —CH$_3$ | H | —CH=CH—CH=CH— | | 4-[N(C$_2$H$_5$)$_2$]phenyl | Zn |
| 2-33 | H | H | H | H | —CH=CH—CH=CH— | | 4-OCH$_3$-phenyl | Co |
| 2-34 | —CH$_3$ | H | —CH$_3$ | H | —CH=CH—CH=CH— | | 2,5-dimethyl-3-methyl-1H-pyrrole (with Cl) | Zn |
| 2-35 | —CH$_3$ | —C$_2$H$_5$ | —CH$_3$ | H | —CH=CH—CH=CH— | | 4-OCH$_3$-phenyl | Zn |
| 2-36 | —CH$_3$ | Br | —CH$_3$ | H | —CH=CH—CH=CH— | | 4-OCH$_3$-phenyl | Zn |
| 2-37 | —CH$_3$ | H | —CH$_3$ | H | —CH=CH—CH=CH— | | 4-OCH$_3$-phenyl | Zn |
| 2-38 | —CH$_3$ | —C$_2$H$_5$ | —CH$_3$ | H | —CH=CH—CH=CH— | | 2,5-dimethyl-3-methyl-4-ethyl-1H-pyrrole | Zn |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-39 | —CH$_3$ | —C$_2$H$_5$ | —CH$_3$ | H | —CH=CH—CH=CH— | | 2,4-dimethyl-3-ethyl-5-methyl pyrrole (H$_3$C, C$_2$H$_5$, CH$_3$ substituted pyrrole, N—H) | Co |
| 2-40 | —CH$_3$ | —C$_2$H$_5$ | —CH$_3$ | H | —CH=CH—CH=CH— | | 4-t-Bu-phenyl-S-CH$_3$ (methylthio) | Zn |
| 2-41 | —CH$_3$ | —C$_2$H$_5$ | —CH$_3$ | H | —CH=CH—CH=CH— | | 4-t-Bu-phenyl-S-CH$_3$ | Co |
| 2-42 | —CH$_3$ | —C$_2$H$_5$ | —CH$_3$ | H | —CH=CH—CH=CH— | | —SC(CH$_3$)$_3$ | Zn |
| 2-43 | —CH$_3$ | —C$_2$H$_5$ | —C$_2$H$_5$ | H | —CH=CH—CH=CH— | | 5-i-Pro-2-methyl-3-(i-Pro-O)-phenyl | Cu |
| 2-44 | —CH$_3$ | —C$_2$H$_5$ | —CH$_3$ | H | —CH=CH—CH=CH— | | 5-i-Pro-2-methyl-3-(i-Pro-O)-phenyl | Cu |
| 2-45 | —CH$_3$ | —C$_2$H$_5$ | —CH$_3$ | H | —CH=CH—CH=CH— | | 5-i-Pro-2-methyl-3-(i-Pro-O)-phenyl | Zn |
| 2-46 | —CH$_3$ | —C$_2$H$_5$ | —CH$_3$ | H | —CH=CH—CH=CH— | | 5-i-Pro-2-methyl-3-(i-Pro-O)-phenyl | Co |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-47 | —CH₃ | —C₂H₅ | phenyl | H | —CH=CH— | —CH=CH— | 2-methyl-5-i-Pro-phenyl (with i-Pro) | Zn |
| 2-48 | —CH₃ | —C₂H₅ | phenyl | H | —CH=CH— | —CH=CH— | 2-methyl-3-i-Pro-5-i-Pro-phenyl | Co |
| 2-49 | —CH₃ | —C₂H₅ | —CH₃ | H | —CH=CH— | —CH=CH— | 2-methyl-3-i-Pro-5-i-Pro-phenyl | Ni |
| 2-50 | —CH₃ | H | —CH₃ | H | —CH=CH— | —CH=CH— | 2-methyl-3-i-Pro-5-i-Pro-phenyl | Co |
| 2-51 | —CH₃ | —CH₃ | —OCH₃ | H | —CH=CH— | —CH=CH— | phenyl | Zn |
| 2-52 | —CH₃ | —CH₃ | —OCH₃ | H | —CH=CH— | —CH=CH— | phenyl | Co |
| 2-53 | —CH₃ | —C₂H₅ | —CH₃ | H | —CH=CH— | —CH=CH— | 4-N(C₄H₉)₂-phenyl | Zn |
| 2-54 | —CH₃ | —CH₃ | —O(CH₂)₂CH(CH₃)₂ | H | —CH=CH— | —CH=CH— | phenyl | Co |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-55 | —$CH_3$ | —$C_2H_5$ | —$C_2H_5$ | H | —CH=CH—CH=CH— | | 2,4-di-i-Pro, 5-methylphenyl (with i-Pro groups and methyl) | Co |
| 2-56 | —$CH_3$ | —$C_6H_{11}$ | —$CH_3$ | H | —CH=CH—CH=CH— | | 4-N($C_2H_5$)$_2$-phenyl | Zn |
| 2-57 | H | —$OC_2H_5$ | —$OC_2H_5$ | H | —CH=CH—CH=CH— | | 2-i-Pro, 4-methyl, 5-i-Pro phenyl | Co |
| 2-58 | —$CH_3$ | —$C_4H_9$ | —$OC_2H_5$ | H | —CH=CH—CH=CH— | | 2-i-Pro, 4-methyl, 5-i-Pro phenyl | Co |
| 2-59 | —$CH_3$ | —$CH_3$ | —$OC_2H_5$ | H | —CH=CH—CH=CH— | | 2-i-Pro, 4-methyl, 5-i-Pro phenyl | Co |
| 2-60 | —$CH_3$ | —$C_6H_{11}$ | —$CH_3$ | H | —CH=CH—CH=CH— | | phenyl | Cu |
| 2-61 | —$CH_3$ | —$CH_2CH(CH_3)_2$ | —$CH_3$ | H | —CH=CH—CH=CH— | | phenyl | Cu |
| 2-62 | —$CH_3$ | —$C_2H_5$ | —$CH_3$ | H | —CH=CH—CH=CH— | | 3,5-di-methyl, 4-methyl, t-Bu substituted phenyl | Co |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-63 | —CH$_3$ | Br | —CH$_3$ | H | —CH=CH—CH=CH— | | 2,6-(H$_3$C)$_2$-4-(t-Bu)-C$_6$H$_2$— | Cu |
| 2-64 | —CH$_3$ | Br | —CH$_3$ | H | —CH=CH—CH=CH— | | 2,6-(H$_3$C)$_2$-4-(t-Bu)-C$_6$H$_2$— | Co |
| 2-65 | —CH$_3$ | —C(CH$_3$)$_3$ | —CH$_3$ | H | —CH=CH—CH=CH— | | C$_6$H$_5$— | Cu |
| 2-66 | —CH$_3$ | Br | —CH$_3$ | H | —CH=CH—CH=CH— | | 2-(i-Pro)-4-methyl-5-(i-Pro)-C$_6$H$_2$— | Ni |
| 2-67 | —CH$_3$ | —C$_2$H$_5$ | —CH$_3$ | H | —CH=CH—CH=CH— | | C$_6$H$_5$— | Ni |
| 2-68 | —CH$_3$ | —CH(CH(CH$_3$)$_2$)$_2$ | —CH$_3$ | H | —CH=CH—CH=CH— | | C$_6$H$_5$— | Cu |
| 2-69 | —CH$_3$ | —CH(CH(CH$_3$)$_2$)$_2$ | —CH$_3$ | H | —CH=CH—CH=CH— | | 2-(i-Pro)-4-methyl-5-(i-Pro)-C$_6$H$_2$— | Cu |

TABLE 2-continued

| Comp. No. | $R_{11}$ | $R_{12}$ | $R_{13}$ | $R_{14}$ | $R_{15}$ | $R_{16}$ | $R_{17}$ | M |
|---|---|---|---|---|---|---|---|---|
| 2-70 | —CH$_3$ | —CH$_2$CH(CH$_3$)$_2$ | —CH$_3$ | H | —CH=CBr— | —CH=CH— | 2,5-di-i-Pro-4-methylphenyl | Cu |
| 2-71 | —CH$_3$ | —C$_2$H$_5$ | —CH$_3$ | H | —CH=CH— | —CH=CH— | —SC(CH$_3$)$_3$ | Cu |
| 2-72 | —CH$_3$ | —C$_2$H$_5$ | —CH$_3$ | —CH$_3$ | —CH=CH— | —CH=CH— | 2,5-di-i-Pro-4-methylphenyl | Zn |
| 2-73 | —CH$_3$ | —C$_2$H$_5$ | —CH$_3$ | —CH$_3$ | —CH=CH— | —CH=CH— | 2,5-di-i-Pro-4-methylphenyl | Cu |
| 2-74 | —CH$_3$ | —C$_2$H$_5$ | —CH$_3$ | H | —CH=C(t-Bu)—CH=CH— | | phenyl | Co |
| 2-75 | —CH$_3$ | —C$_2$H$_5$ | —CH$_3$ | H | —CH=CH— | —CH=CH— | 2-(Et)$_2$N-4-Br-5-i-Pro-phenyl | Co |
| 2-76 | CH=CH-phenyl | —C$_2$H$_5$ | —C$_2$H$_5$ | H | —CH=CH— | —CH=CH— | phenyl | Co |
| 2-77 | CH$_3$-CH=CH— | —CO$_2$C$_2$H$_5$ | —CH$_3$ | H | —CH=CH— | —CH=CH— | —CH$_3$ | Co |
| 2-78 | CH$_3$-CH=CH— | —C$_2$H$_5$ | —CH$_3$ | H | —CH=CH— | —CH=CH— | Cl | Zn |
| 2-79 | CH$_3$OCH$_2$-CH=CH— | | —CH$_3$ | H | —CH=CH— | —CH=CH— | —CO$_2$C$_2$H$_5$ | Mn |

TABLE 3

| Comp. No. | $R_{18}$ | $R_{19}$ | $R_{20}$ | $R_{21}$ | $R_{22}$ | $R_{23}$ | $R_{24}$ | $R_{25}$ | $R_{26}$ | M |
|---|---|---|---|---|---|---|---|---|---|---|
| 3-1 | 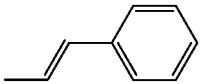 | H | H | H | H | NO$_2$ | H | H | 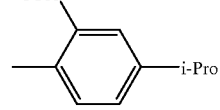 | Cu |
| 3-2 | 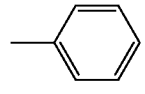 | —C$_2$H$_5$ | 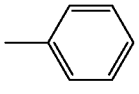 | H | H | —SPh | H | H | 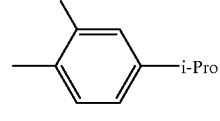 | Cu |
| 3-3 | 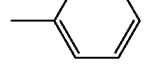 | —(CH$_2$)$_2$CH(CH$_3$)$_2$ | 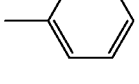 | H | H | —SPh | H | H | 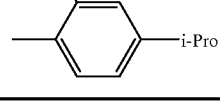 | Cu |

A concrete constitution of the present invention will be described hereinafter.

An optical recording medium of the present invention has a laminate structure, as shown in FIG. 1. That is to say, a recording layer 2 is formed on a substrate 1, and a reflective layer 3 is closely disposed thereon. On this reflective layer 3, another substrate 5 is further stuck thereon via an adhesive layer 4. However, another layer may be formed under or on the recording layer 2, or another layer may be formed on the reflective layer 3.

A material for the substrate should basically be transparent at wavelengths of a recording light and a reproduction light. For example, there can be utilized a polymeric material such as a polycarbonate resin, a vinyl chloride resin, an acrylic resin such as polymethyl methacrylate, a polystyrene resin or an epoxy resin, or an inorganic material such as a glass. The substrate material is molded into disc substrates by injection molding or the like. If necessary, guide grooves or pits may be formed on the surface of the substrate. Such guide grooves or pits are desirably given at the time of the molding of the substrate, but they can be given by using an ultraviolet light setting resin layer on the substrate. When used as a DVD, the substrate is a disc having a thickness of about 1.2 mm, a diameter of about 80 to 120 mm, and a hole of 15 mm in diameter which is made through its center.

In the present invention, the recording layer is formed on the substrate, and the recording layer of the present invention contains at least one dipyrromethene metal chelate compound represented by formula (1). More preferably, it further contains at least one dipyrromethene metal chelate compound represented by formula (2), and most preferably, it further contains at least one dipyrromethene metal chelate compound represented by formula (3). Particularly, the recording layer is required to have a suitable optical constant at a recording and a reproduction laser wavelength selected within 520 nm to 690 nm {the optical constant is represented by a complex index of refraction (n+ki) wherein n and k are coefficients corresponding to a real part n and an imaginary part k, respectively, and here, n and k are defined as a refractive index and an extinction coefficient, respectively}.

In general, an organic dye is characterized in that the refractive index n and the extinction coefficient k largely depend on a wavelength λ. When a value of the refractive index n is less than 1.8, a reflectance and a signal modulated amplitude necessary for the accurate reading of signals cannot be obtained, and even if the extinction coefficient k is in excess of 0.40, the reflectance deteriorates, so that not only a good reproducible signal cannot be obtained but also the signal easily changes by the reproduction light. Hence, the usual organic dye is not practical. In view of the above characteristics, a specific organic dye having the preferable optical constant at the desired laser wavelength should be selected. When such an organic dye is selected and used to form the recording layer, a medium having the high reflectance and the good sensitivity can be obtained.

The dipyrromethene metal chelate compound represented by formula (1) which can be used in the present invention has the above preferable optical constant, and the employment of two or more kinds of dipyrromethene metal chelate compounds for the recording layer makes it easy to select the desired optical constant.

From a practical viewpoint, a difference between maximum absorption wavelengths of these dipyrromethene metal chelate compounds, when two or more kinds of dipyrromethene metal chelate compounds are employed, is preferably 100 nm or less, more preferably 60 nm or less. No particular restriction is put on a mixing ratio of these dipyrromethene metal chelate compounds, but for the above reason, it is preferable to mix them so that the optical constant n may be 2.0 or more and the extinction coefficient k is in the range of 0.04 to 0.20.

The reproduction of the optical recording medium of the present invention by the laser light selected within the range of 520 nm to 690 nm can usually be realized at a reflectance of 20%, and a reflectance of 30% or more is preferable.

Prior to the formation of the recording layer, if necessary, the above dye can be mixed with a quencher, a decomposition accelerator, an ultraviolet light absorber, an adhesive and the like, or compounds having such effects can be introduced as substituents into the dye.

Typical preferable examples of the quencher include metal complexes of acetylacetonates, bisdithiols such as bisdithio-α-diketones and bisphenyldithiols, thiocatechols, salicylaldehydeoximes and thiobisphenolates. In addition, amines are also suitable.

Examples of the decomposition accelerator include metallic compounds such as metallic anti-knock agents, metallocene compounds and metal complexes of acetylacetonates.

Furthermore, if necessary, a binder, a leveling agent and an anti-foaming agent can be used together. Preferable examples of the binder include polyvinyl alcohol, polyvinyl pyrrolidone, nitrocellulose, cellulose acetate, ketone resins, acrylic resins, polystyrene resins, urethane resins, polyvinyl butyrals, polycarbonates and polyolefins.

Prior to the formation of the recording layer on the substrate, a layer comprising an inorganic material or a polymer may be formed on the substrate in order to improve the solvent resistance of the substrate, the reflectance and the record sensitivity.

Here, the content of the dipyrromethene metal chelate compounds represented by formulas (1) to (3) in the recording layer is 30% or more, preferably 60% or more. Incidentally, it is also preferable that the content is virtually 100%.

Examples of a method for forming the recording layer include coating methods by spin coating, spraying, casting and immersing, a sputtering process, a chemical vapor deposition method and a vacuum vapor deposition method, but the coating method by spin coating is simple and hence preferable.

In the case that a coating method such as the spin coating method is employed, there can be used a coating solution prepared by dissolving or dispersing the dipyrromethene metal chelate compounds represented by formulas (1) to (3) in a solvent so as to be in the range of 1 to 40% by weight, preferably 3 to 30% by weight, but in this case, it is preferable to select the solvent which does not damage the substrate. Examples of such a solvent include alcoholic solvents such as methanol, ethanol, isopropyl alcohol, octafluoropentanol, allyl alcohol, methyl cellosolve, ethyl cellosolve and tetrafluoropropanol, aliphatic and alicyclic hydrocarbon solvents such as hexane, heptane, octane, decane, cyclohexane, methylcyclohexane, ethylcyclohexane and dimethylcyclohexane, aromatic hydrocarbon solvents such as toluene, xylene and benzene, halogenated hydrocarbon solvents such as carbon tetrachloride, chloroform, tetrachloroethane and dibromoethane, ether solvents such as diethyl ether, dibutyl ether, di-isopropyl ether and dioxanes, ketone solvents such as acetone and 3-hydroxy-3-methyl-2-butanone, ester solvents such as ethyl acetate and methyl lactate, and water. They may be used singly or in the state of a mixture thereof.

As needed, the dye for the recording layer can be dispersed in a polymeric thin film.

When the solvent which does not damage the substrate cannot be selected, any of the sputtering process, the chemical vapor deposition method and the vacuum vapor deposition method is effective.

No particular restriction is put on the thickness of the recording layer, but it is preferably in the range of 50 nm to 300 nm. If the thickness of the recording layer is less than 50 nm, heat diffusion increases, so that the recording cannot be performed, or distortion occurs on a recording signal, and signal amplitude decreases. Furthermore, if the thickness of the recording layer is more than 300 nm, the reflectance declines, so that reproducible signal characteristics deteriorate.

Next, a reflective layer having a thickness of preferably 50 nm to 300 nm is formed on the recording layer. A material for the reflective layer should have a sufficiently high reflectance at the wavelength of the reproduction light. Examples of the reflective layer material include metals such as Au, Al, Ag, Cu, Ti, Cr, Ni, Pt, Ta, Cr and Pd, and they can be used singly or in the form of an alloy thereof. Above all, Au, Al and Ag have the high reflectance, and hence they are suitable for the materials for the reflective layer. In addition thereto, the reflective layer may contain any of metals and metalloids such as Mg, Se, Hf, V, Nb, Ru, W, Mn, Re, Fe, Co, Rh, Ir, Zn, Cd, Ga, In, Si, Ge, Te, Pb, Po, Sn and Bi. Furthermore, a material including Au as a main component is suitable, because such a material makes it possible to easily obtain the reflective layer having the high reflectance. Here, the main component means that the content of the component is more than 50%. A material other than the above metals can also be used, and for example, a multi-layer film formed by alternately laminating a thin film having a low refractive index and a thin film having a high refractive index can also be used as the reflective layer.

Examples of a method for forming the reflective layer include the sputtering process, an ion plating method, the chemical vapor deposition method and the vacuum vapor deposition method. In addition, on the substrate or under the reflective layer, a known inorganic or organic intermediate layer or an adhesive layer can be deposited for the sake of the improvement of the reflectance, the recording characteristics and adhesive properties.

Moreover, a protective layer is formed on the reflective layer, and no particular restriction is put on a material for the protective layer, so long as it can protect the reflective layer from an outer force. Examples of an organic material for the protective layer include thermoplastic resins, thermosetting resins, electron beam curable resins and ultraviolet light curable resins. Furthermore, examples of an inorganic material for the protective layer include $SiO_2$, $Si_3N_4$, $MgF_2$ and $SnO_2$. The thermoplastic resin or the thermosetting resin is dissolved in a suitable solvent, and the resultant coating solution is applied and then dried to form the protective layer. The ultraviolet light curable resin may be directly applied, or it may be dissolved in a suitable solvent to prepare a coating solution, and this coating solution may be then applied and then irradiated with ultraviolet light to cure it, thereby forming the protective layer. Examples of the ultraviolet light curable resin include acrylate resins such as urethane acrylates, epoxy acrylates and polyester acrylates. These materials may be used singly or in the form of a mixture thereof, or they may be used in the form of a single layer or a multi-layer film.

Examples of a method for forming the protective layer include coating methods by spin coating and casting, the sputtering process and the chemical vapor deposition method, as in the case of the recording layer, but above all, the spin coating method is preferable.

The thickness of the protective layer is usually in the range of 0.1 $\mu$m to 100 $\mu$m, but in the present invention, it is preferably in the range of 3 $\mu$m to 30 $\mu$m, more preferably 5 $\mu$m to 20 $\mu$m.

On the protective layer, a print such as a label can be further carried out.

Alternatively, a protective sheet or a substrate may be stuck on the reflective layer, or there may be used a means in which the reflective layers are set so as to face each other, and two optical recording media may be then stuck.

In addition, on the mirror surface of the substrate, an ultraviolet light curable resin, an inorganic thin film or the like may be formed for the protection of the surface and the prevention of dust deposition.

No particular restriction is put on a laser having wavelengths of 520 nm to 690 nm referred to in the present invention, but examples of such a laser include a dye laser which permits a wavelength selection in a wide visible light range, a helium neon laser having a wavelength of 633 nm, a high output semiconductor laser having wavelengths of about 680, 650 and 635 nm which has been recently developed, and a harmonic conversion YAG laser having a wavelength of 532 nm. In the present invention, at one wavelength or plural wavelengths selected from these lasers, a high-density recording and reproduction can be realized.

Next, the present invention will be described in accordance with some examples, but the scope of the present invention should not be limited at all by these examples.

EXAMPLE 1

0.2 g of a dipyrromethene metal chelate compound (1-4) was dissolved in 10 ml of dimethylcyclohexane to prepare a dye solution. A substrate which was used therein was made of a polycarbonate resin and had a continuous guide groove (track pitch: 0.8 $\mu$m), a diameter of 120 mm, a thickness of 0.6 mm and a disc shape.

This substrate was spin-coated with this dye solution at a rotational speed of 1500 rpm, and it was then dried at 70° C. for 3 hours to form a recording layer. With regard to an optical constant of this recording layer, n and k at 635 nm were 2.3 and 0.11, respectively.

On this recording layer, Au was sputtered by the use of a sputter device (CDI-900) made by Bulzars Co., Ltd., thereby forming a reflective layer having a thickness of 100 nm. As a sputter gas, argon gas was used. With regard to sputter conditions, sputter power was 2.5 kW, and a sputter gas pressure was $1.0 \times 10^{-2}$ Torr.

Furthermore, an ultraviolet light curable adhesive SD-301 (made by Dainippon Ink & Chemicals, Inc.) was spin-coated on the reflective layer, and on this adhesive film, there was put a disc substrate made of the polycarbonate resin and having a diameter of 120 mm and a thickness of 0.6 mm. Afterward, irradiation was made with ultraviolet light to obtain a stuck optical recording medium.

On the thus obtained optical recording medium, recording was carried out at a linear velocity of 3.8 m/s and a laser power of 10 mW so that a shortest pit length might be 0.40 $\mu$m by the use of an optical disc evaluation device (DDU-1000) made by Pulstec Industrial Co., Ltd. carrying a semiconductor laser head in which a numerical aperture of a lens was 0.6 at a wavelength of 635 nm and an EFM encoder made by KENWOOD Co., Ltd. After the recording, signals were reproduced by an evaluation device carrying 650 nm and 635 nm red semiconductor laser heads (the numerical aperture of the lens was 0.6), and reflectance, jitter and modulated amplitude were then measured. As a result, these values were all good, and the reflectance was 56%, the jitter was 8.5%, and the modulated amplitude was 0.63 in the case of the reproduction at 650 nm. In addition, even after a light resistance test for 100 hours by carbon arc and a wet heat resistance test at 80° C. and 85% RH, any change was not observed. Moreover, even when the reproduction was repeated million times under a reproduction light of 0.7 mW, the change of the jitter was 1% or less.

EXAMPLE 2

An optical recording medium was prepared by the same procedure as in Example 1 except that there was used a disc substrate made of a polycarbonate resin and having a continuous guide groove (track pitch: 0.74 $\mu$m), a diameter of 120 mm and a thickness of 0.6 mm.

On the thus obtained optical recording medium, recording was carried out in the same manner as in Example 1 by the use of an optical disc evaluation device (DDU-1000) made by Pulstec Industrial Co., Ltd. and an EFM encoder made by KENWOOD Co., Ltd. After the recording, signals were reproduced by an evaluation device carrying a 650 nm red semiconductor laser head, and reflectance, jitter and modulated amplitude were then measured. As a result, these values were all good, and the reflectance was 56%, the jitter was 8.6%, and the modulated amplitude was 0.62 in the case of the reproduction at 650 nm. In addition, even after a light resistance test for 100 hours by carbon arc and a wet heat resistance test at 80° C. and 85% RH, any change was not observed. Moreover, even when the reproduction was repeated million times under a reproduction light of 0.7 mW, the change of the jitter was 1% or less.

EXAMPLES 3 to 87

An optical recording medium was prepared by the same procedure as in Example 1 except that each of dipyrromethene metal chelate compounds shown in Tables 1 and 2 was used, and recording was then carried out. After the recording, signals were reproduced by an evaluation device carrying a 650 nm red semiconductor laser head, and reflectance, jitter and modulated amplitude were then measured. As a result, these values were all good. In addition, even after a light resistance test for 100 hours by carbon arc and a wet heat resistance test at 80° C. and 85% RH, any change was not observed. Moreover, even when the reproduction was repeated million times under a reproduction light of 0.7 mW, the change of the jitter was 1% or less.

In Examples 1 to 87 described above, optical constants of recording layers as well as reflectances, jitters and modulated amplitudes in the case that the respective optical record media were recorded at 635 nm and reproduced at 650 nm are shown all together in Table 4.

TABLE 4

| Example | Comp. No. | λmax (nm) | Optical constant (635 nm) n | Optical constant (635 nm) d | Reproduction properties at 650 nm Refrectance (%) | Reproduction properties at 650 nm Jitter (%) | Reproduction properties at 650 nm Modulated amplitude |
|---|---|---|---|---|---|---|---|
| 1 | 1-4 | 602 | 2.30 | 0.11 | 56 | 8.5 | 0.63 |
| 2 | 1-4 | 602 | 2.30 | 0.11 | 56 | 8.6 | 0.62 |
| 3 | 1-27 | 591 | 2.27 | 0.07 | 50 | 8.5 | 0.68 |
| 4 | 1-77 | 581 | 2.28 | 0.06 | 53 | 10.0 | 0.68 |
| 5 | 1-29 | 599 | 2.29 | 0.09 | 46 | 10.5 | 0.64 |
| 6 | 1-78 | 588 | 2.26 | 0.06 | 55 | 11.0 | 0.68 |
| 7 | 1-2 | 577 | 2.24 | 0.06 | 58 | 9.5 | 0.67 |
| 8 | 1-79 | 565 | 2.26 | 0.07 | 56 | 10.0 | 0.66 |
| 9 | 1-6 | 579 | 2.10 | 0.05 | 57 | 10.0 | 0.68 |
| 10 | 1-80 | 568 | 2.29 | 0.05 | 56 | 10.2 | 0.64 |
| 11 | 1-39 | 589 | 2.26 | 0.09 | 52 | 8.6 | 0.64 |
| 12 | 1-81 | 579 | 2.27 | 0.06 | 56 | 10.3 | 0.67 |
| 13 | 1-48 | 586 | 2.30 | 0.09 | 51 | 9.0 | 0.68 |
| 14 | 1-82 | 575 | 2.27 | 0.07 | 58 | 10.2 | 0.62 |
| 15 | 1-83 | 610 | 2.28 | 0.13 | 45 | 11.0 | 0.61 |
| 16 | 1-84 | 604 | 2.29 | 0.09 | 48 | 9.0 | 0.65 |
| 17 | 1-85 | 600 | 2.26 | 0.08 | 48 | 9.0 | 0.65 |
| 18 | 1-86 | 592 | 2.26 | 0.08 | 50 | 9.2 | 0.64 |
| 19 | 1-87 | 588 | 2.26 | 0.08 | 55 | 10.0 | 0.64 |
| 20 | 1-88 | 584 | 2.10 | 0.08 | 50 | 10.0 | 0.65 |
| 21 | 1-89 | 598 | 2.29 | 0.09 | 52 | 9.4 | 0.63 |
| 22 | 1-90 | 592 | 2.26 | 0.08 | 47 | 9.0 | 0.67 |
| 23 | 1-91 | 594 | 2.27 | 0.09 | 48 | 9.1 | 0.65 |

TABLE 4-continued

| Example | Comp. No. | λmax (nm) | Optical constant (635 nm) n | Optical constant (635 nm) d | Reproduction properties at 650 nm Refrectance (%) | Reproduction properties at 650 nm Jitter (%) | Reproduction properties at 650 nm Modulated amplitude |
|---|---|---|---|---|---|---|---|
| 24 | 1-92 | 583 | 2.30 | 0.06 | 52 | 9.9 | 0.65 |
| 25 | 1-93 | 589 | 2.26 | 0.06 | 50 | 9.0 | 0.66 |
| 26 | 1-94 | 602 | 2.29 | 0.09 | 51 | 9.1 | 0.65 |
| 27 | 1-95 | 587 | 2.26 | 0.06 | 52 | 8.9 | 0.65 |
| 28 | 1-96 | 570 | 2.26 | 0.05 | 55 | 10.2 | 0.64 |
| 29 | 1-97 | 585 | 2.27 | 0.06 | 53 | 10.4 | 0.64 |
| 30 | 1-98 | 595 | 2.26 | 0.07 | 48 | 9.0 | 0.65 |
| 31 | 1-99 | 602 | 2.29 | 0.09 | 48 | 9.0 | 0.64 |
| 32 | 1-100 | 598 | 2.28 | 0.09 | 50 | 9.2 | 0.64 |
| 33 | 1-42 | 590 | 2.26 | 0.08 | 53 | 8.7 | 0.66 |
| 34 | 1-49 | 591 | 2.27 | 0.08 | 53 | 8.6 | 0.66 |
| 35 | 1-43 | 599 | 2.29 | 0.09 | 52 | 8.5 | 0.65 |
| 36 | 1-41 | 602 | 2.27 | 0.09 | 47 | 9.3 | 0.62 |
| 37 | 1-101 | 585 | 2.26 | 0.07 | 55 | 8.5 | 0.66 |
| 38 | 1-38 | 592 | 2.27 | 0.08 | 49 | 8.8 | 0.67 |
| 39 | 1-34 | 590 | 2.26 | 0.08 | 53 | 9.0 | 0.68 |
| 40 | 1-32 | 597 | 2.30 | 0.09 | 48 | 9.4 | 0.62 |
| 41 | 1-102 | 585 | 2.26 | 0.08 | 55 | 11.0 | 0.68 |
| 42 | 1-40 | 581 | 2.10 | 0.06 | 58 | 9.2 | 0.66 |
| 43 | 1-103 | 592 | 2.26 | 0.08 | 50 | 8.9 | 0.66 |
| 44 | 1-104 | 593 | 2.26 | 0.08 | 57 | 10.0 | 0.68 |
| 45 | 1-105 | 59 | 2.25 | 0.07 | 56 | 10.1 | 0.64 |
| 46 | 1-8 | 598 | 2.24 | 0.08 | 52 | 8.8 | 0.64 |
| 47 | 1-106 | 590 | 2.26 | 0.07 | 56 | 10.6 | 0.67 |
| 48 | 1-14 | 595 | 2.29 | 0.08 | 51 | 9.0 | 0.68 |
| 49 | 1-107 | 599 | 2.26 | 0.09 | 50 | 9.1 | 0.62 |
| 50 | 1-108 | 603 | 2.24 | 0.09 | 48 | 8.9 | 0.61 |
| 51 | 1-109 | 604 | 2.27 | 0.09 | 49 | 9.0 | 0.65 |
| 52 | 1-110 | 583 | 2.22 | 0.06 | 48 | 9.8 | 0.64 |
| 53 | 1-111 | 585 | 2.29 | 0.06 | 50 | 10.0 | 0.64 |
| 54 | 1-112 | 590 | 2.23 | 0.07 | 55 | 10.0 | 0.64 |
| 55 | 1-113 | 572 | 2.26 | 0.05 | 52 | 10.0 | 0.65 |
| 56 | 1-114 | 594 | 2.27 | 0.08 | 50 | 8.9 | 0.63 |
| 57 | 1-115 | 578 | 2.10 | 0.06 | 55 | 10.5 | 0.67 |
| 58 | 1-116 | 580 | 2.15 | 0.06 | 52 | 10.2 | 0.65 |
| 59 | 1-117 | 577 | 2.26 | 0.06 | 52 | 10.5 | 0.64 |
| 60 | 1-118 | 580 | 2.22 | 0.06 | 54 | 10.5 | 0.66 |
| 61 | 1-119 | 577 | 2.26 | 0.06 | 51 | 10.3 | 0.65 |
| 62 | 1-120 | 592 | 2.30 | 0.08 | 52 | 8.8 | 0.65 |
| 63 | 1-121 | 582 | 2.26 | 0.06 | 55 | 10.2 | 0.64 |
| 64 | 1-122 | 585 | 2.29 | 0.06 | 53 | 10.4 | 0.64 |
| 65 | 1-45 | 595 | 2.26 | 0.08 | 55 | 8.8 | 0.67 |
| 66 | 1-46 | 591 | 2.28 | 0.08 | 56 | 9.2 | 0.66 |
| 67 | 1-47 | 596 | 2.26 | 0.08 | 53 | 9.0 | 0.65 |
| 68 | 1-123 | 581 | 2.30 | 0.07 | 56 | 9.5 | 0.62 |
| 69 | 1-124 | 568 | 2.20 | 0.06 | 59 | 9.3 | 0.65 |
| 70 | 1-125 | 575 | 2.40 | 0.09 | 68 | 9.7 | 0.65 |
| 71 | 1-126 | 582 | 2.20 | 0.11 | 55 | 9.6 | 0.62 |
| 72 | 1-127 | 570 | 2.20 | 0.08 | 58 | 9.8 | 0.67 |
| 73 | 1-128 | 577 | 2.30 | 0.12 | 56 | 9.4 | 0.66 |
| 74 | 1-129 | 583 | 2.30 | 0.10 | 57 | 9.3 | 0.63 |
| 75 | 1-130 | 574 | 2.40 | 0.13 | 61 | 9.4 | 0.64 |
| 76 | 1-131 | 586 | 2.30 | 0.08 | 55 | 9.2 | 0.64 |
| 77 | 1-132 | 574 | 2.50 | 0.11 | 56 | 9.3 | 0.67 |
| 78 | 1-133 | 578 | 2.20 | 0.07 | 56 | 9.4 | 0.68 |
| 79 | 1-134 | 580 | 2.30 | 0.09 | 58 | 9.3 | 0.62 |
| 80 | 1-135 | 575 | 2.30 | 0.06 | 59 | 9.5 | 0.66 |
| 81 | 1-136 | 571 | 2.40 | 0.07 | 56 | 9.6 | 0.65 |
| 82 | 1-137 | 582 | 2.40 | 0.06 | 57 | 9.3 | 0.65 |
| 83 | 1-138 | 570 | 2.50 | 0.10 | 55 | 9.6 | 0.64 |
| 84 | 1-139 | 569 | 2.30 | 0.07 | 58 | 9.7 | 0.64 |
| 85 | 1-140 | 580 | 2.40 | 0.10 | 57 | 9.3 | 0.65 |
| 86 | 1-141 | 573 | 2.40 | 0.07 | 59 | 9.5 | 0.63 |
| 87 | 1-142 | 585 | 2.30 | 0.08 | 60 | 9.6 | 0.67 |

EXAMPLES 88 to 106

An optical recording medium was prepared by the same procedure as in Example 2 except that dipyrromethene metal chelate compounds shown in Tables 1 to 3 were suitably mixed and used, and recording was then carried out. After the recording, signals were reproduced by an evaluation device carrying a 650 nm red semiconductor laser head, and reflectance, jitter and modulated amplitude were then measured. As a result, these values were all good. In addition, even after a light resistance test for 100 hours by carbon arc and a wet heat resistance test at 80° C. and 85% RH, any change was not observed. Moreover, even when the reproduction was repeated million times under a reproduction light of 0.7 mW, the change of the jitter was 1% or less.

COMPARATIVE EXAMPLE 1

An optical recording medium was prepared by the same procedure as in Example 1 except that 0.2 g of a dipyrromethene metal chelate compound (2-43) was dissolved in 10 ml of dimethylcyclohexane, followed by spin coat. On the thus obtained optical recording medium, recording was carried out in the same manner as in Example 1 at a linear velocity of 3.8 m/s and a laser power of 10 mW by the use of an optical disc evaluation device (DDU-1000) made by Pulstec Industrial Co., Ltd. carrying a 635 nm semiconductor laser head and an EFM encoder made by KENWOOD Co., Ltd. After the recording, signals were reproduced by an evaluation device carrying a 650 nm red semiconductor laser head, and reflectance, jitter and modulated amplitude were then measured. As a result, in the case of the reproduction at 650 nm, the reflectance was 61%, the jitter was 20% or more, and the modulated amplitude was 0.64. Thus, the jitter properties were poor.

COMPARATIVE EXAMPLE 2

An optical recording medium was prepared by the same procedure as in Example 1 except that 0.2 g of a dipyrromethene metal chelate compound (2-23) was dissolved in 10 ml of dimethylcyclohexane, followed by spin coat. On the thus obtained optical recording medium, recording was carried out in the same manner as in Example 1 at a linear velocity of 3.8 m/s and a laser power of 10 mW by the use of an optical disc evaluation device (DDU-1000) made by Pulstec Industrial Co., Ltd. carrying a 635 nm semiconductor laser head and an EFM encoder made by KENWOOD Co., Ltd. After the recording, signals were reproduced by an evaluation device carrying 650 nm and 635 nm red semiconductor laser heads, and reflectance, jitter and modulated amplitude were then measured. As a result, in the case of the reproduction at 650 nm, the reflectance was 60%, the jitter was 20% or more, and the modulated amplitude was 0.65, and in the case of the reproduction at 635 nm, the reflectance was 61%, the jitter was 20% or more, and the modulated amplitude was 0.66. Thus, the jitter properties were poor. In addition, after a light resistance test for 100 hours by carbon arc, the signals deteriorated, so that the reproduction was impossible.

COMPARATIVE EXAMPLE 3

An optical recording medium was prepared by the same procedure as in Example 1 except that 1 g of a pentamethinecyanine dye "NK-2929" [1,3,3,1',3',3'-hexamethyl-2',2'-(4,5,4',5'-dibenzo)indodicarbocyanine perchlorate made by Nippon Kankou Shikiso Laboratory Co., Ltd.] was dissolved in 10 ml of tetrafluoropropanol, followed by spin coating. On the thus obtained optical recording medium, recording was carried out in the same manner as in Example 1 at a linear velocity of 3.8 m/s and a laser power of 10 mW by the use of an optical disc evaluation device (DDU-1000) made by Pulstec Industrial Co., Ltd. carrying a 635 nm semiconductor laser head and an EFM encoder made by KENWOOD Co., Ltd. After the recording, signals were reproduced by an evaluation device carrying a 650 rm red semiconductor laser head, and reflectance, jitter and modulated amplitude were then measured. As a result, in the case of the reproduction at 650 nm, the reflectance was 9%, the jitter was 20% or more, and the modulated amplitude was 0.13. Hence, these values were poor. In addition, after a light resistance test for 100 hours by carbon arc, the signals deteriorated, so that the reproduction was impossible.

In Examples 88 to 106 and Comparative Examples 1 to 3 described above, optical constants of recording layers as well as reflectances, jitters and modulated amplitudes in the case that the respective optical record media were recorded at 635 nm and reproduced at 650 nm are shown all together in Table 5 (examples) and Table 6 (Comparative Examples). In Table 5, each mixing ratio means such a weight ratio of the dipyrromethene metal compound that a concentration of the dipyrromethene metal und is 20 g/l with respect to dimethylcyclohexane.

TABLE 6

| Comparative Example | Compound | λmax (nm) | Optical constant n | Optical constant k | Reproduction properties at 650 nm Reflectance (%) | Jitter (%) | Modulated amplitude |
|---|---|---|---|---|---|---|---|
| 1 | 2-43 | 565 | 2.00 | 0.04 | 61 | 20< | 0.64 |
| 2 | 2-23 | 580 | 2.30 | 0.12 | 60 | 20< | 0.65 |
| 3 | NK2929 | — | 1.80 | 1.30 | 9 | 20< | 0.13 |

EXAMPLE 107
Synthesis of Dipyrromethene Metal Chelate Compound (1-4)

1.35 g of 2-formyl-5-[(E)-phenylethen-1-yl]pyrrole and 1.9 g of 1-formyl-3-(2,4-diisopropylphenyl)isoindole were dissolved in 100 ml of ethanol, and 1.18 g of 47% hydrobromic acid was then added dropwise, followed by stirring at room temperature for 3 hours. After concentration under reduced pressure, extraction was carried out with 300 ml of chloroform, and after water washing and separation, the solvent was distilled off to obtain 3.0 g of a compound represented by the following structural formula (9-a):

TABLE 5

| Example | Comp. 1 (λmax (nm)) | Comp. 2 (λmax (nm)) | Dif. of λmax | Mixing Ratio | Optical constant n | Optical constant k | Reproduction properties at 650 nm Reflectance (%) | Jitter (%) | Modulated amplitude |
|---|---|---|---|---|---|---|---|---|---|
| 88 | 1-1 (580) | 1-4 (602) | 22 | 7:3 | 2.20 | 0.08 | 52 | 8.2 | 0.65 |
| 89 | 1-4 (602) | 1-27 (591) | 11 | 5:5 | 2.30 | 0.10 | 49 | 7.8 | 0.64 |
| 90 | 1-9 (614) | 1-40 (582) | 32 | 3:7 | 2.28 | 0.09 | 49 | 7.9 | 0.62 |
| 91 | 1-9 (614) | 1-38 (581) | 33 | 3:7 | 2.29 | 0.09 | 50 | 8.0 | 0.61 |
| 92 | 1-9 (614) | 1-27 (591) | 23 | 3:7 | 2.31 | 0.11 | 48 | 7.8 | 0.61 |
| 93 | 1-9 (614) | 1-27 (591) | 23 | 5:5 | 2.40 | 0.15 | 47 | 7.5 | 0.61 |
| 94 | 1-11 (607) | 1-27 (591) | 16 | 5:5 | 2.26 | 0.11 | 49 | 8.1 | 0.63 |
| 95 | 2-1 (510) | 1-56 (553) | 43 | 1:9 | 2.10 | 0.06 | 55 | 8.7 | 0.69 |
| 96 | 1-19 (616) | 1-49 (589) | 27 | 4:6 | 2.29 | 0.11 | 48 | 8.0 | 0.62 |
| 97 | 2-14 (521) | 1-8 (598) | 77 | 2:8 | 2.26 | 0.09 | 51 | 2.8 | 0.64 |
| 98 | 1-34 (590) | 1-47 (596) | 6 | 5:5 | 2.31 | 0.11 | 48 | 8.0 | 0.61 |
| 99 | 3-1 (610) | 2-72 (561) | 49 | 7:3 | 2.08 | 0.07 | 55 | 8.6 | 0.67 |
| 100 | 1-14 (595) | 2-74 (565) | 30 | 7:3 | 2.26 | 0.09 | 49 | 7.9 | 0.62 |
| 101 | 2-43 (565) | 1-17 (625) | 60 | 2:8 | 2.25 | 0.08 | 52 | 8.0 | 0.61 |
| 102 | 1-13 (592) | 1-55 (585) | 7 | 6:4 | 2.29 | 0.12 | 48 | 8.1 | 0.63 |
| 103 | 1-15 (604) | 2-73 (563) | 41 | 8:2 | 2.13 | 0.09 | 50 | 8.3 | 0.65 |
| 104 | 2-5 (520) | 1-7 (607) | 87 | 1:9 | 2.15 | 0.08 | 51 | 8.4 | 0.64 |
| 105 | 1-4 (602) | 1-38 (581) | 21 | 3:7 | 2.39 | 0.13 | 47 | 7.6 | 0.64 |
| 106 | 3-1 (610) | 1-40 (614) | 4 | 6:4 | 2.35 | 0.12 | 48 | 7.7 | 0.63 |

(9-a)

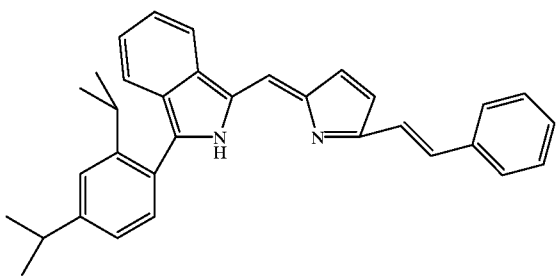

Next, 1.4 g of compound (9-a) were dissolved in 200 ml of ethanol, and 0.56 g of copper acetate was then added, followed by stirring for 2 hours at a reflux temperature. After concentration under reduced pressure, the resultant precipitate was collected by filtration, and then washed with methanol and water to obtain 1.2 g of a compound represented by the structural formula (1-4):

(1-4)

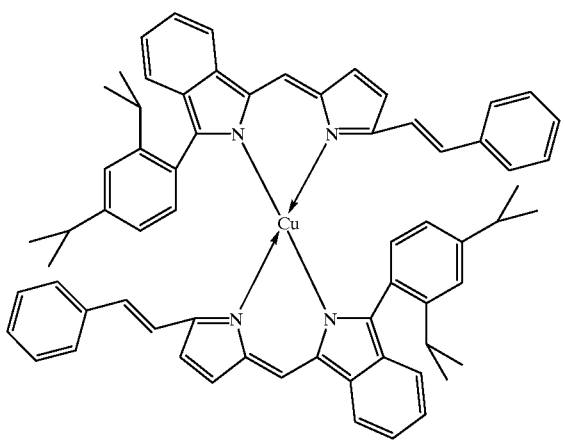

It was confirmed on the basis of the following analytical results that the thus obtained compound was the desired compound.
Elemental analysis ($C_{66}H_{62}N_4CU$)

|  | C | H | N |
|---|---|---|---|
| Calcd. (%) | 81.32 | 6.41 | 5.75 |
| Found (%) | 81.82 | 6.61 | 5.69 |
| MS (m/e): 975 (M⁺) | | | |

The thus obtained compound showed a maximum absorption at 589 nm in a toluene solution and had a Gram absorbancy index of $1.30 \times 10^5$ ml/g.cm.

EXAMPLE 108

Synthesis of Dipyrromethene Metal Chelate Compound (1-58)

1.74 g of 2-formyl-5-[(E)-4-t-butylphenylethen-1-yl]pyrrole and 1.9 g of 1-formyl-3-(2,4-diisopropylphenyl)-isoindole were dissolved in 100 ml of ethanol, and 1.18 g of 47% hydrobromic acid was then added dropwise, followed by stirring at room temperature for 3 hours. After concentration under reduced pressure, extraction was carried out with 300 ml of chloroform, and after water washing and separation, the solvent was distilled off to obtain 3.1 g of a compound represented by the following structural formula (9-b):

(9-b)

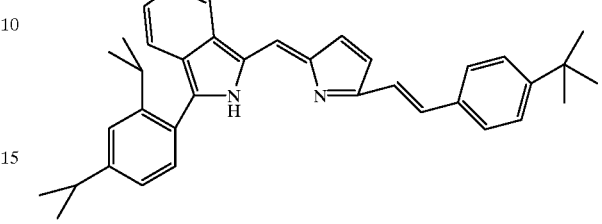

Next, 1.57 g of compound (9-b) were dissolved in 200 ml of ethanol, and 0.56 g of copper acetate was then added, followed by stirring for 2 hours at a reflux temperature. After concentration under reduced pressure, the resultant precipitate was collected by filtration, and then washed with methanol and water to obtain 1.5 g of a compound represented by the structural formula (1-58):

(1-58)

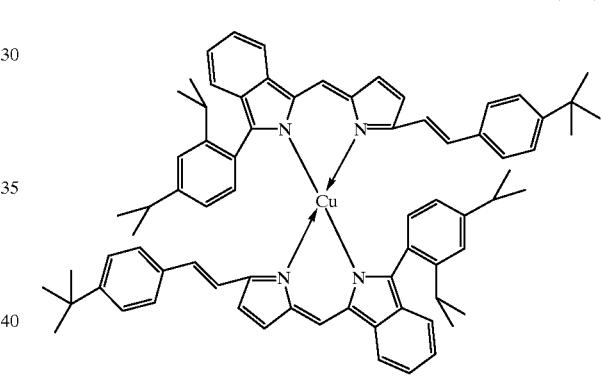

It was confirmed on the basis of the following analytical results that the thus obtained compound was the desired compound.
Elemental analysis ($C_{74}H_{78}N_4Cu$)

|  | C | H | N |
|---|---|---|---|
| Calcd. (%) | 81.77 | 7.23 | 5.15 |
| Found (%) | 81.48 | 7.46 | 5.22 |
| MS (m/e): 1087 (M⁺) | | | |

The thus obtained compound showed a maximum absorption at 588 nm in a toluene solution and had a Gram absorbancy index of $1.15 \times 10^5$ ml/g.cm.

EXAMPLE 109

Synthesis of Dipyrromethene Metal Chelate Compound (1-63) 1.74 g of 2-formyl-3,4-diethyl-5-[(E)-phenylethen-1-yl]pyrrole and 1.9 g of 1-formyl-3-(2,4-diisopropylphenyl)-isoindole were dissolved in 100 ml of ethanol, and 1.18 g of 47% hydrobromic acid was then added dropwise, followed by stirring at room temperature for 3 hours. After concentration under reduced pressure, extraction was carried out with 300 ml of chloroform, and after water washing and separation, the solvent was distilled off to obtain 3.1 g of a compound represented by the following structural formula (9-c):

(9-c)

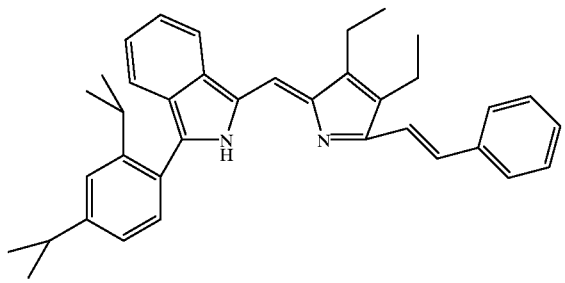

Next, 1.57 g of compound (9-c) were dissolved in 200 ml of ethanol, and 0.56 g of copper acetate was then added, followed by stirring for 2 hours at a reflux temperature. After concentration under reduced pressure, the resultant precipitate was collected by filtration, and then washed with methanol and water to obtain 1.6 g of a compound represented by the structural formula (1-63):

(1-63)

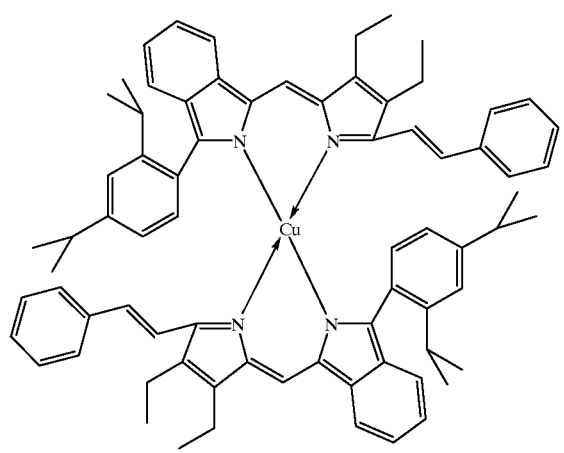

It was confirmed on the basis of the following analytical results that the thus obtained compound was the desired compound.

Elemental analysis ($C_{74}H_{78}N_4CU$)

|  | C | H | N |
|---|---|---|---|
| Calcd. (%) | 81.77 | 7.23 | 5.15 |
| Found (%) | 81.52 | 7.52 | 5.33 |
| MS (m/e): 1087 (M⁺) | | | |

The thus obtained compound showed a maximum absorption at 595 nm in a toluene solution and had a Gram absorbancy index of $1.05 \times 10^5$ ml/g.cm.

EXAMPLE 110

Synthesis of Dipyrromethene Metal Chelate Compound (1-65)

1.4 g of a compound represented by formula (9-a) were dissolved in 100 ml of ethanol, and 0.76 g of cobalt acetate tetrahydrate was then added, followed by stirring at a reflux temperature for 4 hours. After concentration under reduced pressure, the resultant precipitate was collected by filtration, and then washed with methanol and water to obtain 1.3 g of a compound represented by the structural formula (1-65):

(1-65)

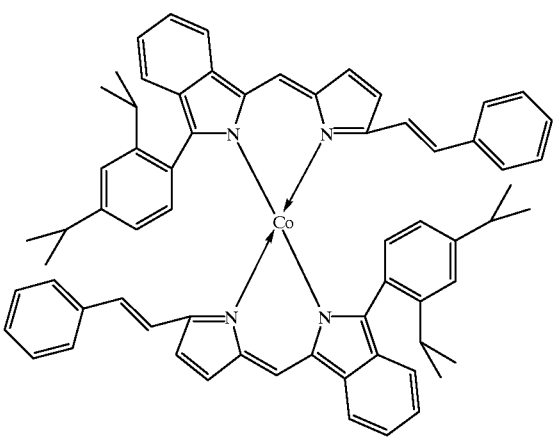

It was confirmed on the basis of the following analytical results that the thus obtained compound was the desired compound.

Elemental analysis ($C_{66}H_{62}N_4CO$)

|  | C | H | N |
|---|---|---|---|
| Calcd. (%) | 81.71 | 6.44 | 5.77 |
| Found (%) | 81.65 | 6.51 | 5.87 |
| MS (m/e): 970 (M⁺) | | | |

The thus obtained compound showed a maximum absorption at 575 nm in a toluene solution and had a Gram absorbancy index of $1.50 \times 10^5$ ml/g.cm.

EXAMPLE 111

Synthesis of Dipyrromethene Metal Chelate Compound (1-69)

1.39 g of 2-formyl-5-(2-thienylethen-1-yl)pyrrole and 1.32 g of 1-formyl-3-phenylisoindole were dissolved in 100 ml of ethanol, and 1.18 g of 47% hydrobromic acid was then added dropwise, followed by stirring at room temperature for 3 hours. After concentration under reduced pressure, extraction was carried out with 300 ml of chloroform, and after water washing and separation, the solvent was distilled off to obtain 2.6 g of a compound represented by the structural formula (9-d):

(9-d)

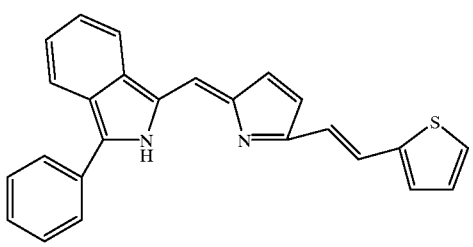

Next, 1.2 g of compound (9-d) were dissolved in 200 ml of ethanol, and 0.56 g of copper acetate was then added, followed by stirring at a reflux temperature for 2 hours. After concentration under reduced pressure, the resultant precipitate was collected by filtration, and then washed with methanol and water to obtain 1.1 g of a compound represented by the structural formula (1-69):

(1-69)

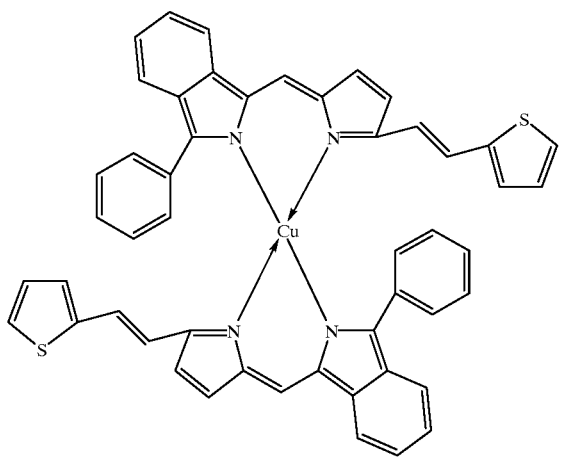

It was confirmed on the basis of the following analytical results that the thus obtained compound was the desired compound.

Elemental analysis ($C_{50}H_{34}N_4S_2CU$)

|  | C | H | N | S |
|---|---|---|---|---|
| Calcd. (%) | 73.37 | 4.19 | 6.84 | 7.83 |
| Found (%) | 73.56 | 4.33 | 6.75 | 8.00 |
| MS (m/e): 819 (M⁺) | | | | |

The thus obtained compound showed a maximum absorption at 602 nm in a toluene solution and had a Gram absorbancy index of $1.57 \times 10^5$ ml/g.cm.

EXAMPLE 112

Synthesis of Dipyrromethene Metal Chelate Compound (1-72)

1.2 g of a compound represented by formula (9-d) were dissolved in 200 ml of ethanol, and 0.56 g of zinc acetate was then added, followed by stirring at a reflux temperature for 5 hours. After concentration under reduced pressure, the resultant precipitate was collected by filtration, and then washed with methanol and water to obtain 1.2 g of a compound represented by the structural formula (1-72):

(1-72)

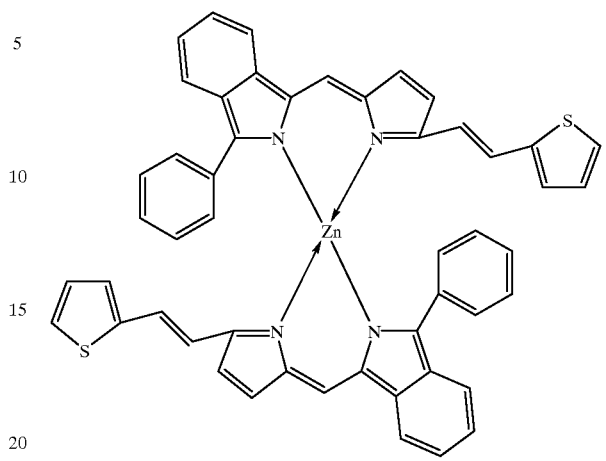

It was confirmed on the basis of the following analytical results that the thus obtained compound was the desired compound.

Elemental analysis ($C_{50}H_{34}N_4S_2Zn$)

|  | C | H | N | S |
|---|---|---|---|---|
| Calcd. (%) | 73.21 | 4.18 | 6.83 | 7.82 |
| Found (%) | 73.36 | 4.22 | 6.77 | 7.95 |
| MS (m/e): 820 (M⁺) | | | | |

The thus obtained compound showed a maximum absorption at 597 nm in a toluene solution and had a Gram absorbancy index of $1.72 \times 10^5$ ml/g.cm.

What is claimed is:

1. An optical recording medium having at least a recording layer and a reflective layer on a substrate, wherein at least one dipyrromethene metal chelate compound represented by formula (1) is contained in the recording layer:

(1)

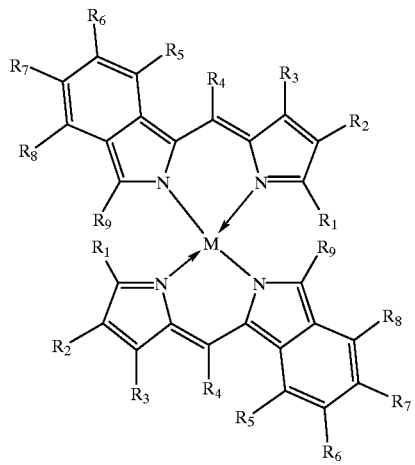

wherein $R_1$ and $R_9$ are each independently an alkenyl group, an aryl group or a heteroaryl group; $R_2$ to $R_8$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms; and M is a transition metal.

2. The optical recording medium according to claim 1 wherein at a laser wavelength of 520 to 690 nm, a refractive index and an extinction coefficient of the recording layer are 1.8 or more and 0.04 to 0.40, respectively.

3. The optical recording medium according to claim 1 which is recordable and reproducible by a laser beam selected within the wavelength range of 520 to 690 nm.

4. The optical recording medium according to claim 1 wherein $R_1$ in formula (1) is —CH=CH—$R_{10}$, wherein $R_{10}$ is a hydrogen atom, a halogen atom, or a substituted or unsubstituted alkyl, alkoxy, alkenyl, acyl, alkoxycarbonyl, aralkyl, aryl or heteroaryl group having 20 or less carbon atoms.

5. The optical recording medium according to claim 4 wherein at a laser wavelength of 520 to 690 nm, a refractive index and an extinction coefficient of the recording layer are 1.8 or more and 0.04 to 0.40, respectively.

6. The optical recording medium according to claim 4 which is recordable and reproducible by a laser beam selected within the wavelength range of 520 to 690 nm.

7. A dipyrromethene metal chelate compound represented by formula (4):

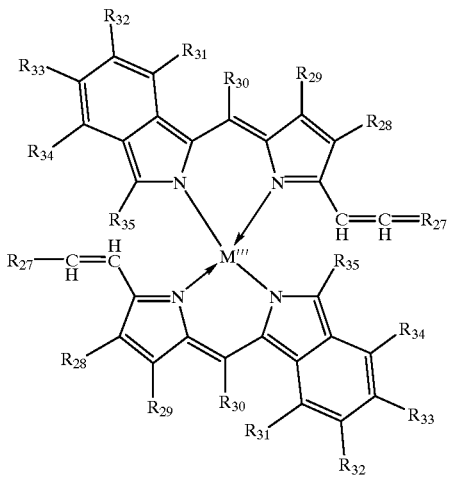

(4)

wherein $R_{27}$ to $R_{35}$ are each independently a hydrogen atom, a halogen atom, or a substituted or unsubstituted alkyl, alkoxy, alkenyl, acyl, alkoxycarbonyl, aralkyl, aryl or heteroaryl group having 20 or less carbon atoms; and $M'''$ is a transition element.

* * * * *